United States Patent
Maichel et al.

(10) Patent No.: US 7,225,827 B2
(45) Date of Patent: *Jun. 5, 2007

(54) INSERTION VALVE AND INSTALLATION METHOD

(75) Inventors: Jeffrey L. Maichel, Temecula, CA (US); Thomas A. Sovilla, La Habra, CA (US)

(73) Assignee: Occlude, La Mirada, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/867,448

(22) Filed: Jun. 14, 2004

(65) Prior Publication Data

US 2004/0222399 A1    Nov. 11, 2004

Related U.S. Application Data

(63) Continuation-in-part of application No. 10/376,552, filed on Feb. 28, 2003, now Pat. No. 6,776,184.

(51) Int. Cl.
*F16K 43/00* (2006.01)

(52) U.S. Cl. .................. 137/318; 138/94; 138/97; 251/327; 251/328; 251/330

(58) Field of Classification Search ............... 137/318, 137/321–322, 15.14; 251/326–330, 214; 138/94, 97

See application file for complete search history.

(56) References Cited

U.S. PATENT DOCUMENTS

| | | | |
|---|---|---|---|
| 587,107 A | 7/1897 | Sherrerd | |
| 1,743,338 A | 1/1930 | Field | |
| 1,805,710 A * | 5/1931 | Wilkins | 137/318 |
| 1,898,935 A * | 2/1933 | Brandriff | 137/318 |
| 2,636,713 A * | 4/1953 | Hamer | 251/328 |
| 2,840,100 A * | 6/1958 | Stephenson | 137/318 |
| 2,899,983 A | 8/1959 | Farris | |
| 3,412,750 A * | 11/1968 | Volpin | 251/330 |
| 3,650,547 A | 3/1972 | Tickett | |
| 3,799,182 A | 3/1974 | Long | |
| 3,948,282 A | 4/1976 | Yano | |
| 4,141,378 A * | 2/1979 | Wegner et al. | 137/317 |

(Continued)

OTHER PUBLICATIONS

Product Sheet of Mueller Co., Decatur, Illinois showing an H-800 Inserting valve.

(Continued)

*Primary Examiner*—John Bastianelli
(74) *Attorney, Agent, or Firm*—Loyal McKinley Hanson

(57) ABSTRACT

A valve assembly for insertion in a pipe containing fluid under pressure includes a valve body adapted to be assembled over the pipe and a valve-stopping mechanism that mounts on the valve body. The hollow valve body interior and an access opening in the valve body are sufficiently large to receive a hole saw element no smaller than the outside diameter of the pipe as installers advance the hole saw element radially through the access opening to form a gap in the pipe. The valve-stopping mechanism includes a gate with a cross sectional area greater than the pipe that mates with the valve body interior so that the gate can be advanced radially through the gap in the pipe into direct fluid-tight contact of the valve body in order to thereby stop the flow of fluid through the pipe.

1 Claim, 33 Drawing Sheets

U.S. PATENT DOCUMENTS

| | | |
|---|---|---|
| 4,483,514 A | 11/1984 | Kennedy |
| 4,527,586 A | 7/1985 | Yano et al. |
| 4,532,957 A | 8/1985 | Battle et al. |
| 5,063,957 A | 11/1991 | Yano et al. |
| 5,074,526 A | 12/1991 | Ragsdale et al. |
| 5,183,364 A | 2/1993 | Hardwig |
| 5,316,037 A | 5/1994 | Martin |
| 5,327,923 A | 7/1994 | Eischen et al. |
| 5,611,365 A | 3/1997 | Maichel |
| 5,660,199 A | 8/1997 | Maichel |
| 5,676,171 A | 10/1997 | Heed |
| 5,732,728 A | 3/1998 | Maichel |
| 6,041,806 A | 3/2000 | Maichel |
| 6,308,726 B2 | 10/2001 | Sato et al. |
| 6,357,471 B1 | 3/2002 | Sato et al. |
| 6,470,907 B1 | 10/2002 | Sato et al. |
| 6,530,389 B2 | 3/2003 | Sato et al. |
| 2001/0010233 A1 | 8/2001 | Sato et al. |
| 2002/0148503 A1 | 10/2002 | Sato et al. |

OTHER PUBLICATIONS

Product Sheet of Mueller Co. showing a Resilient Wedge Gate Valve.
Product Sheet of Hydra-Stop, Inc., Blue Island, Illinois for an Insta-Valve.
Product Sheet of Romac Industries, Inc. for a QuikValve.
Product Sheet of Romac Industries, Inc. for an Inserta Valve.

* cited by examiner

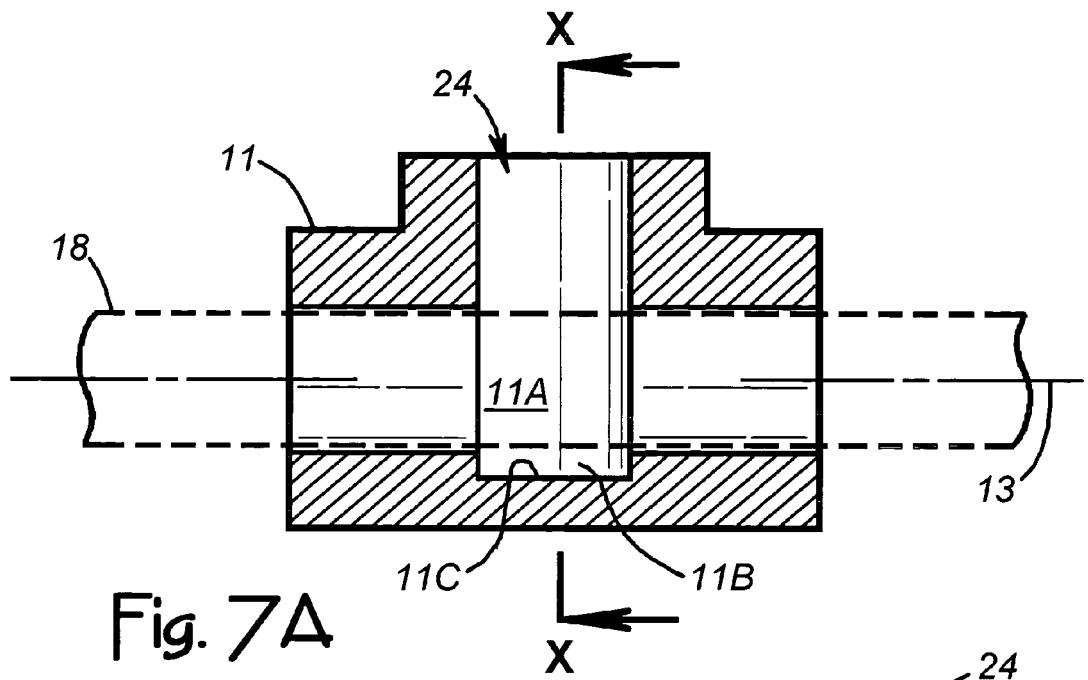
Fig. 7A
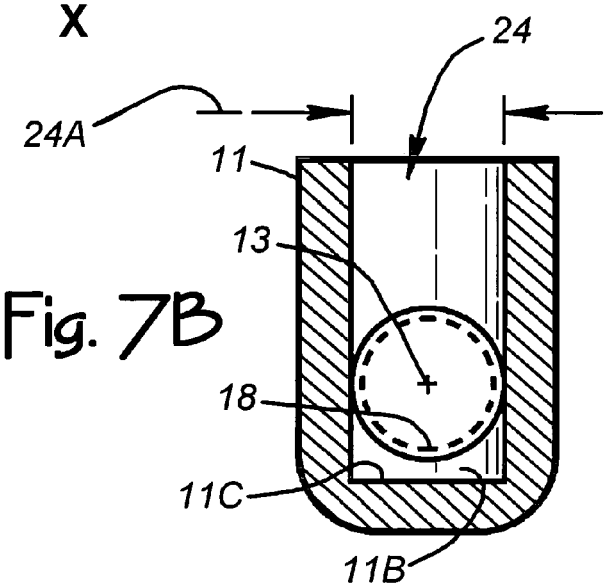
Fig. 7B
Fig. 7C
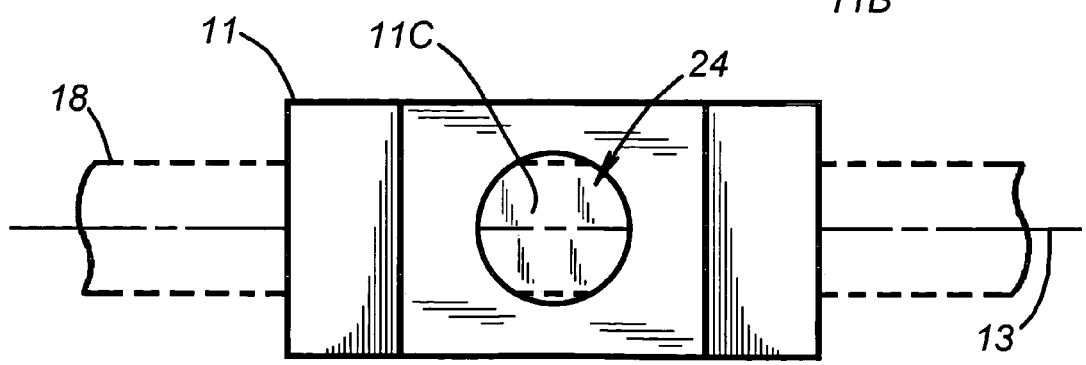

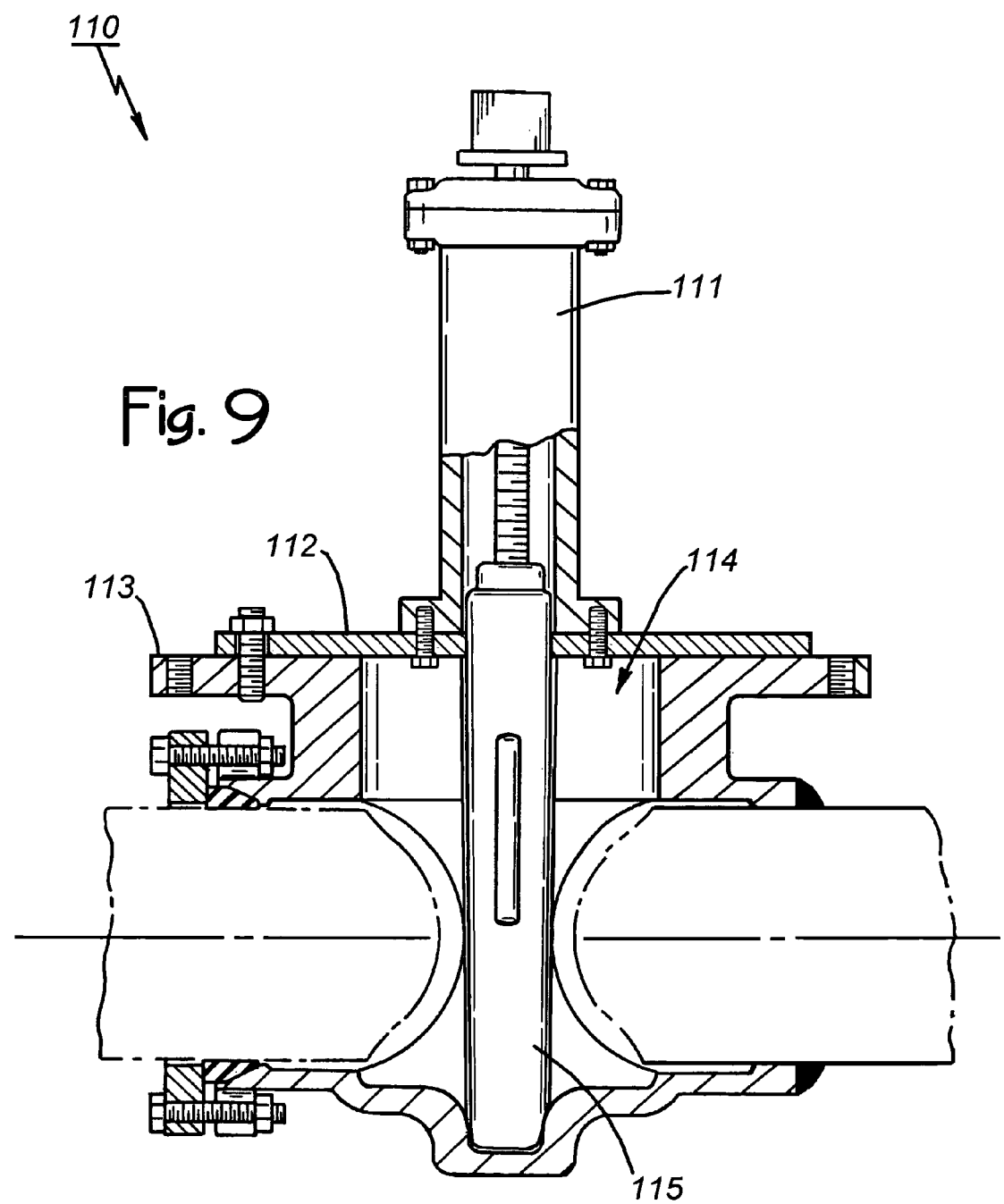

INSERTION VALVE AND INSTALLATION METHOD

CROSS REFERENCE TO RELATED APPLICATION

This application is a continuation in part of U.S. patent application Ser. No. 10/376,552 filed Feb. 28, 2003, now U.S. Pat. No. 6,776,184 B1 issued Aug. 17, 2004.

BACKGROUND OF THE INVENTION

1. Technical Field

This invention relates generally to procedures and equipment for stopping an existing water, sewer, gas, or other line containing fluid under pressure, and more particularly to a valve assembly and installation method for inserting a valve in a line without otherwise shutting down the line during the insertion.

2. Description of Related Art

The task of inserting a valve in a line containing fluid under pressure (e.g., a municipal water line or natural gas line) without otherwise shutting down the line during the insertion can be expensive, inconvenient, and time consuming. Yet the need to do so is commonplace. Damaged fire hydrants, for example, frequently need replacement and doing so quickly in a cost-effective manner often involves shutting down water service while a valve is inserted in a water line branch feeding the fire hydrant.

One existing way of inserting a valve into a fire hydrant water line or other line without shutting down service proceeds by cutting a hole in the pipe with a known type of hot-tapping hole saw apparatus. A valving apparatus is then added that forces a rubber plunger into the hole. The rubber plunger expands enough to block the line. Withdrawing the plunger unblocks the line.

One problem with the rubber plunger technique is that success of the valving apparatus depends on the internal size and condition of the pipe. In addition, an old, corroded or otherwise damaged and weakened pipe is subject to being broken. Furthermore, pushing a plug through a tapped hole subjects the rubber gate to being cut by the sharp edges of the hole cut in the pipe each time the gate is opened and closed. For those and other reasons that will become more apparent, users need a better way to insert a valve in a water line or other line containing fluid under pressure.

SUMMARY OF THE INVENTION

This invention addresses the concerns outlined above by providing a valve assembly and installation method that function independent of internal size and condition of the existing pipe. A first subassembly (a valve body that assembles over the pipe) includes a bonnet-supporting flange that defines an access opening. A section of the pipe is cut and removed through the access opening to form a gate-receiving gap in the pipe that completely severs or separates the pipe into separate sections. A second subassembly (a bonnet) is then mounted on the bonnet-supporting flange over the access opening where it operates to advance a gate through the gate-receiving gap in the pipe and into fluid-tight sealing engagement of the valve body without needing to contact the pipe to effect a seal. Thus, the condition of the pipe does not affect the seal.

To paraphrase some of the more precise language appearing in the claims and introduce the nomenclature used, the invention provides a valve assembly for insertion in a line formed by an existing pipe containing fluid under pressure. The valve assembly includes a first subassembly that forms a valve body and a second subassembly that forms a bonnet. The valve body has opposite first and second ends, a valve body axis extending between the first and second ends, and a bonnet-supporting flange intermediate the first and second ends that defines an access opening facing radially away from the valve body axis. The valve body is adapted to be assembled over the existing pipe so that the pipe extends along the valve body axis between the first and second ends of the valve body and so that a user or other installer can access the pipe within the valve body through the access opening for purposes of cutting and removing a section of the existing pipe in order to form a gate-receiving gap in the pipe.

The bonnet includes a gate and the bonnet is adapted to function as means for moving the gate through the access opening into the valve body, between an open position of the gate in which the first and second ends of the valve body are in fluid communication, and a closed position of the gate in which the gate extends through the gate-receiving gap in the pipe and into fluid-tight engagement of the valve body so that the first and second ends of the valve body are not in fluid communication. The flange-mating portion of the bonnet defines a gate opening through which the gate extends from the bonnet in a fluid-tight fit, and the flange-mating portion of the bonnet mounts on the valve body over the access opening in a fluid-tight fit. That arrangement enables a user to mount the bonnet on the valve body through a temporary isolation valve mounted on the bonnet-supporting flange in order to thereby facilitate insertion of the valve assembly when the existing pipe contains fluid under pressure.

In line with the above, a method of inserting a valve in a line having an existing pipe includes the step of providing the valve body subassembly and the bonnet subassembly described above, together with a temporary isolation valve, pipe-cutting means, and bonnet-mounting means. The method proceeds by (i) assembling the valve body over the existing pipe, (ii) mounting a temporary isolation valve on the bonnet-supporting flange, (iii) cutting and removing a section of the existing pipe through the isolation valve to form the gate-receiving gap in the pipe (iv) installing the bonnet through the isolation valve, and then (v) removing the isolation value up over the bonnet.

Thus, the invention overcomes problems associated with some existing techniques for inserting a valve in a line with a valve assembly and installation method that significantly facilitate the process. It overcomes problems associated with prior art that cuts a cylindrical section out of a pipe by rotating around the valve body axis in order to insert a valve under pressure. Although a hole saw apparatus advances radially without rotating around the valve body axis, the hole saw is typically used for cutting a hole in one side of a pipe (e.g., in order to tap the line). The invention, among other things, overcomes many problems associated with cutting out a cylindrical section of pipe for valve insertion purposes by assembling a valve body over the pipe that has an oversized interior for receiving an oversize hole-cutting element of a hole saw.

The hole-cutting element is oversize in that it is no smaller than the outside diameter of the pipe. The interior of the valve body is oversize because it is sufficiently large to receive the rotating hole-cutting element as it cuts all the way through the pipe to form a gap in the pipe. In other words, the width of the valve body interior (measured perpendicular to the valve body axis and perpendicular to the direction of radial advancement of the hole-cutting element) is greater than the outside diameter of the hole-cutting element.

The section of pipe cut out to form the gap is not cylindrical (i.e., not straight across transverse cuts) but the gap nonetheless serves the desired function of receiving a valve-stopping element in fluid-tight engagement of the valve body in order to selectively stop the flow of fluid through the pipe. More specifically, the instant invention assembles a non-rotatable, rigid valve body over an existing pipe. The valve body is welded, fused, or otherwise suitably attached to the existing pipe. It can be otherwise mechanically restrained as desired relative to the existing pipe prior to cutting the pipe.

The valve body includes a radially outwardly facing access opening through which workmen cut a gate-receiving gap in the existing pipe with a radially advancing hole saw. After cutting the gate-receiving gap in the existing pipe (a gap that results in completely separate upstream and downstream portions of the pipe), the workmen remove the hole saw and insert a gate form of valve-stopping element through the access opening into an operative position within the valve body. The gate can be moved to a closed position in which it extends through the gap in the pipe into fluid-tight engagement of the mating valve body.

The structure and methodology of the instant invention are less complex and less costly than rotatable insertion equipment. The structure is sturdy and can avoid many obstacles in the field that may hinder rotating circumferentially about the pipe. An oversize valve body and oversized hole saw solve the problem.

In addition, the sturdy, non-rotating structure is less vulnerable to tensions occurring as the pipe is cut. As a gap is created in an existing pipeline, tremendous tensions commonly occur that can cause binding and otherwise disable rotational valve body structure. Pipeline tension is common in outdoor and indoor pipelines, caused by compaction of earth and shifting earth against buried pipelines and the hanging weight and expansion and/or contraction of indoor pipelines by temperatures and flows.

Existing rotatable insertion equipment uses multiple separate seal-off housings held in rotational relationship to each over a pipe in order to form a gap in the pipe. The resulting structure is vulnerable to the tensions that occur as the pipe is cut. The instant invention overcomes this because the valve body is a rigid structure that does not have separate parts that are rotatable about the valve body axis relative to each other. The bonnet-supporting flange is not rotatable about the valve body axis relative to the first and second ends of the valve body. A strong, rigid valve body results, and it can be fully welded or fused and otherwise mechanically restrained prior to forming a gap in the pipeline. The following illustrative drawings and detailed description make the foregoing and other objects, features, and advantages of the invention more apparent.

BRIEF DESCRIPTION OF THE DRAWINGS

FIG. 7A is a diagrammatic representation of the valve body portion of the valve assembly, depicted in cross section as viewed in a vertical bisecting plane that contains the valve body axis;

FIG. 7B is a diagrammatic representation of the valve body, depicted in cross section as viewed in a vertical plane that contains a line X—X in FIG. 7A;

FIG. 7C is a top plan view of the valve body;

FIG. 9 is an elevation view similar to FIG. 2 that illustrates variations incorporated in a third embodiment of the invention;

DESCRIPTION OF THE PREFERRED EMBODIMENTS

Figure 1:
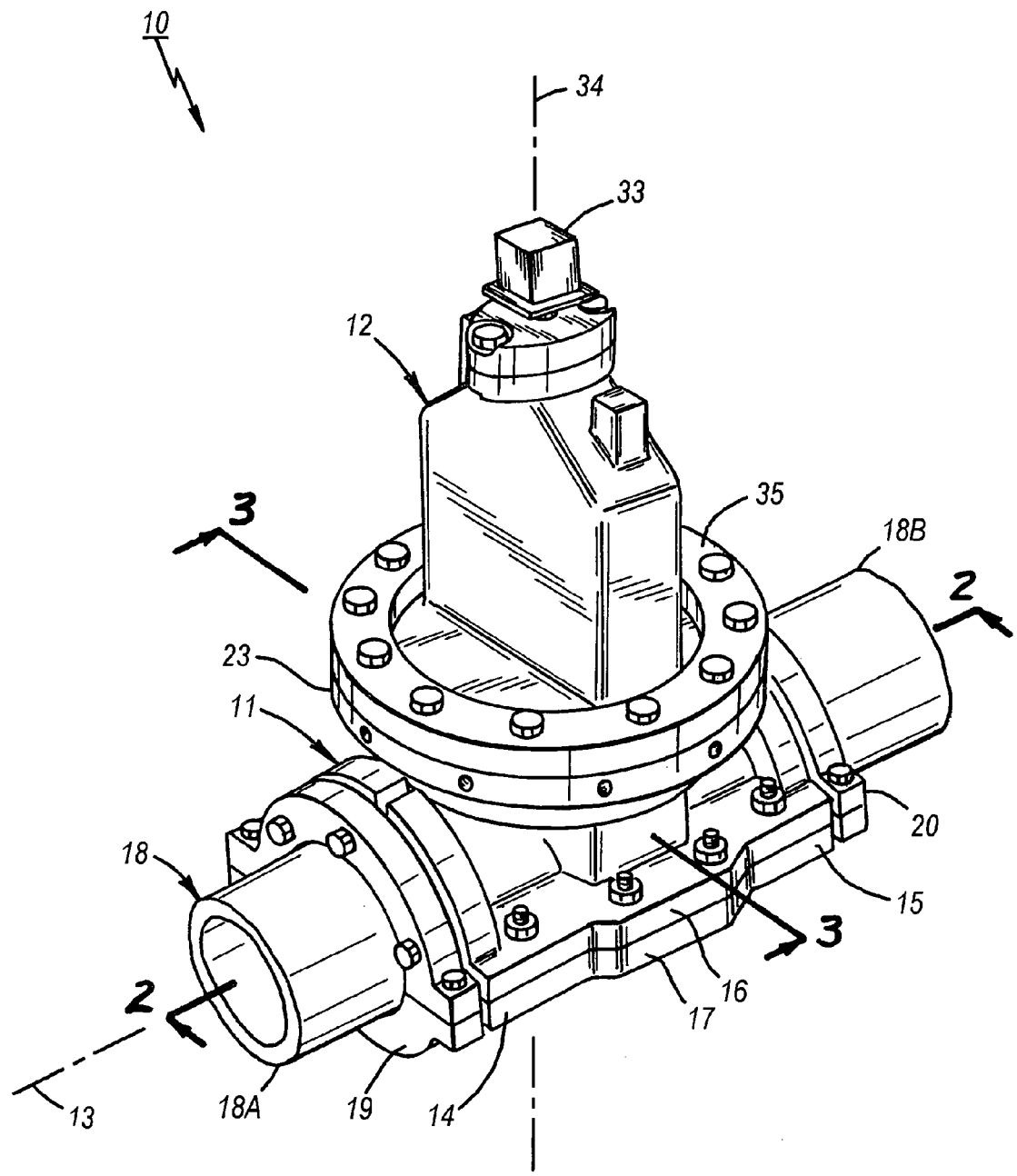
FIG. 1 of the drawings is an isometric view of a valve assembly constructed according for insertion in a line containing fluid under pressure.

FIGS. 1–5 of the drawings show various aspects of a valve assembly 10 constructed according to the invention. Generally, the valve assembly 10 includes first and second subassemblies referred to in this description as a valve body 11 and a bonnet 12. The valve body 11 extends along a valve body axis 13 between first and second ends 14 and 15 of the valve body 11, and it includes two valve body sections 16 and 17 (e.g., ductile iron, steel, composite material, or other suitable composition) that are adapted to be bolted together or otherwise assembled over an existing pipe 18 having a predetermined outside diameter (OD).

The OD of the six-inch pipe 18 might typically measure about 6.5 inches to 7.75 inches, although the invention works with sixteen-inch OD and even larger pipe. A valve body constructed according to the invention is sized according to the pipe OD with which it will be used. The first and second valve body sections 16 and 17 of the illustrated valve body 11 fit over the six-inch OD of the pipe 18, with the valve body 11 and the pipe 18 disposed coaxially relative to the valve body axis 13. First and second glands 19 and 20 bolt onto the first and second valve body sections 16 and 17 where they bear against first and second split rubber seals 21 and 22 in order to seal the first and second ends 14 and 15 of the valve body 11 on the pipe 18. The glands and rubber seals may take the form of known types of components. So assembled, the valve body 11 combines with the glands 19 and 20 and the seals 21 and 22 in a fluid-tight valve body subassembly over the pipe 18. In other words, they form a fluid-tight chamber (e.g., watertight) encircling the existing pipe 18. Stated another way, the valve body 11 defines a fluid-tight hollow interior.

The valve body 11 includes a bonnet-supporting flange 23 (also referred to herein as a flange portion). It is bonnet-supporting in that the bonnet 12 is mounted on it and supported by it as described later on. The bonnet-supporting flange 23 defines an access opening 24 that is identified in FIGS. 2, 3, and 5. The access opening 24 faces radially away from the valve body axis 13 and it provides access to the interior chamber 11A defined by the valve body 11. The access opening 24 is large enough to receive a cylindrically shaped cutting element (also referred to herein as a cylindrically shaped hole-cutting element) having an outside diameter no less than the OD of the pipe 18, and the interior chamber 11A (also referred to herein as the hollow interior 11A of the valve body 11) is sufficiently large to enable the user (i.e., the person or persons installing the assembly) to cut all the way through the existing pipe 18 with the cylindrically shaped cutting element. In other words, the access opening 24 is sufficiently large to receive the cylindrically shaped hole-cutting element having an outside diameter no less than the predetermined outside diameter of the pipe 18 as the hole-cutting element advances radially relative to the valve body axis through the access opening 24 toward the pipe 18, and the valve body 11 defines a hollow interior 11A that is sufficiently large to receive the cylindrically shaped hole-cutting element as the cylindrically shaped hole-cutting element rotates and advances entirely through the pipe to form a gap in the pipe 18. The user advances the cylindrically shaped cutting element through the access opening 24 in order to cut and remove a section of pipe from the pipe 18 and thereby form a gap in the pipe 18 as discussed later on in this description with reference to FIGS. 6A–6K.

The illustrated access opening 24 is circularly shaped with a diameter somewhat larger than the OD of the pipe 18 (e.g., in order to facilitate use of a cylindrically shaped cutting element having an outside diameter a little larger than the OD of the pipe 18. Cutting the pipe 18 all the way through (i.e., entirely through) that way results in two separate pipe sections 18A and 18B separated by a gate-receiving gap 18C. It is a gate-receiving gap in that it enables a gate (described later on) to be advance to a position between the pipe sections 18A and 18B where the gate blocks fluid flow between the pipe sections.

The bonnet 12 includes a housing 25 that defines a hollow interior 26 of the bonnet 12. The hollow interior 26 is identified in FIG. 3. The bonnet 12 also includes a flange-mating portion 27 of the housing 25 that is shaped and dimensioned to fit into the access opening 24 in a fluid-tight fit. The flange-mating portion 27 may include an O-ring seal or other suitable means to help effect the fluid-tight fit. Set screws or other suitable means function as means for securing the flange-mating portion 27 within the access opening 24. One such set screw 28 is identified in FIG. 2 and another such set screw 29 is identified in FIG. 3.

In addition, the bonnet 12 includes a gate 30 and a gate-advancing mechanism 31 (e.g., a rotatable threaded stem and nut combination). The gate-advancing mechanism 31 functions as means for enabling a user to advance the gate 30 between open and closed positions of the gate 30. The flange-mating portion 27 defines a gate opening 32 through which the gate 30 extends in a fluid-tight fit. The gate opening 32 is identified in FIG. 2. The gate-advancing mechanism 31 advances and withdraws the gate 30 through the gate opening 32 in response to the user turning a square head portion 33 of the gate-advancing mechanism 31 (e.g., with a wrench or other suitable gate-operating means). As the square head portion 33 rotates on a rotational axis 34 that is perpendicular to the valve body axis 13, the gate 30 advances or withdraws along the rotational axis 34. The gate 30 is also referred to herein as a moveable valve-stopping element or just valve-stopping element. Using that term, the second subassembly is adapted to be mounted on the flange portion of the valve body after a gap has been cut in the pipe and function as means for selectively stopping the flow of fluid through the valve body with the valve-stopping element by advancing the valve-stopping element radially relative to the valve body axis through the gap in the pipe into fluid-tight engagement of the valve body.

In the closed position of the gate 30 illustrated in FIGS. 2–5, the gate is disposed in the gate-receiving gap 18C, between the pipe sections 18A and 18B, with the gate 30 being in fluid-tight engagement of the valve body 11 and in fluid-tight engagement of the flange-mating portion 27 of the bonnet 12. So disposed, the gate 30 blocks the flow of fluid between the pipe sections 18A and 18B. Fluid cannot flow around the gate 30 via the hollow interior 26 of the housing 25 because at least one (preferably both) of opposite faces 30A and 30B of the gate 30 contacts the flange-mating portion 27 of the bonnet 12. Stated another way, the gate 30 is adapted to extend, in the closed position of the gate 30, through the gate-receiving gap 18C in the pipe 18 and into direct fluid-tight engagement of the valve body 11 without needing to rely on contact with the pipe 18 to effect a seal. It is so adapted in the sense that it has a size and shape suitable to so engage the valve body 11; the size and shape mates with the interior of the valve body 11. Preferably, the valve body 11 defines an inwardly facing groove in which the gate 30 seats. In the open position of the gate 30, the gate 30 does not block the flow of fluid between the pipe sections 18A and 18B because the gate 30 is withdrawn from the closed position as depicted by the phantom line 34 in FIG. 3.

The illustrated gate 30 is fabricated from ductile iron in the desired shape and then a rubber coating is bonded on using known transfer mold or compression mold techniques. The rubber coating helps effect the desired fluid-tight seal between the gate 30 and the valve body 11 and between the gate 30 and the flange-mating portion 27 of the bonnet 12. As an idea of size, the illustrated gate 30 (for use with six-inch pipe) measures about 9.0 inches wide (parallel to the gate faces 30A and 30B and perpendicular to the rotational axis 34). The access opening 24 is large enough to pass the gate 30, and the flange-mating portion 27 is sized to fit snugly within the access opening 24. After mounting the bonnet 12 on the valve body 11, the user bolts a retainer ring 35 (FIGS. 1–3) onto the bonnet-supporting flange 23 to help secure the bonnet 12 in place. The result is a solid, long-term, permanent valve installation.

Recapitulating, the valve body 11 is adapted to be assembled over the existing pipe 18 so that the pipe 18 extends along the valve body axis 13 between the first and second ends 14 and 15 of the valve body 11 and so that the user can access the pipe 18 within the valve body 11 through the access opening 24 for purposes of cutting and removing a section of the existing pipe 18 in order to form the gate-receiving gap 18C in the pipe 18 that results in spaced apart first and second pipe sections 18A and 18B. The bonnet 12 is adapted to function as means for moving the gate 30 through the access opening 24 into the interior chamber 11A of the valve body 11, between an open position of the gate 30 in which the first and second ends 14 and 15 of the valve body 11 (i.e., the two pipe sections 18A and 18B) are in fluid communication and a closed position of the gate 30 in which the gate 30 extends through the gate-receiving gap 18C and into fluid-tight engagement of the valve body 11 such that the first and second ends 14 and 15 of the valve body 11 are not in fluid communication. The flange-mating portion 27 of the bonnet 12 defines a gate opening 32 through which the gate 30 extends from the bonnet 12 in a fluid-tight fit, and the flange-mating portion 27 of the bonnet 11 fits into the access opening 32 in a fluid-tight fit, thereby enabling the user to mount the bonnet 12 on the valve body 11 through a temporary isolation valve mounted on the bonnet-supporting flange 27 (as described below) in order to facilitate insertion when the existing pipe 18 contains fluid under pressure.

Figure 6A:
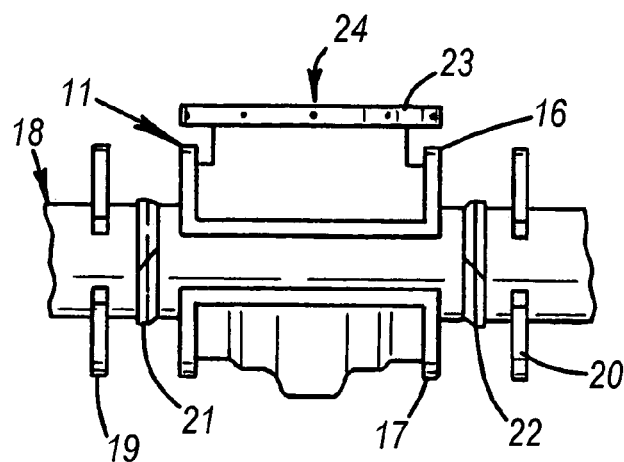
FIG. 6A through 6K are diagrammatic representations of various steps of the installation methodology used to install the valve assembly in an existing line.

FIGS. 6A–6K illustrate valve installation diagrammatically in further detail. The existing pipe 18 represents an existing line carrying fluid (e.g., water or natural gas) under pressure. The two valve body sections 16 and 17 are assembled over the pipe 18 and bolted together as depicted in FIG. 6A with rubber gaskets 36A and 36B (visible in FIGS. 3 and 4) being included between the two valve body sections 16 and 17. The first and second split rubber seals 21 and 22 are then forced between the pipe 18 and the two valve body sections 16 and 17 (in the positions illustrated in FIGS. 2–4) by assembling the glands 19 and 20 over the pipe 18 and bolting them to the two valve body sections 16 and 17. The glands 19 and 20 may take the form of known types of components that include known-types of restraining devices (not shown) built into them to hold the existing pipe 18 in place. When compressed by the glands 19 and 20, the first and second split rubber seals 21 and 22 result in a fluid-tight seal between the pipe 18 and the valve body 11, and that results in a fluid-tight chamber 11A within the valve body 11 once the access opening 24 is sealed as subsequently explained.

Figure 6B:
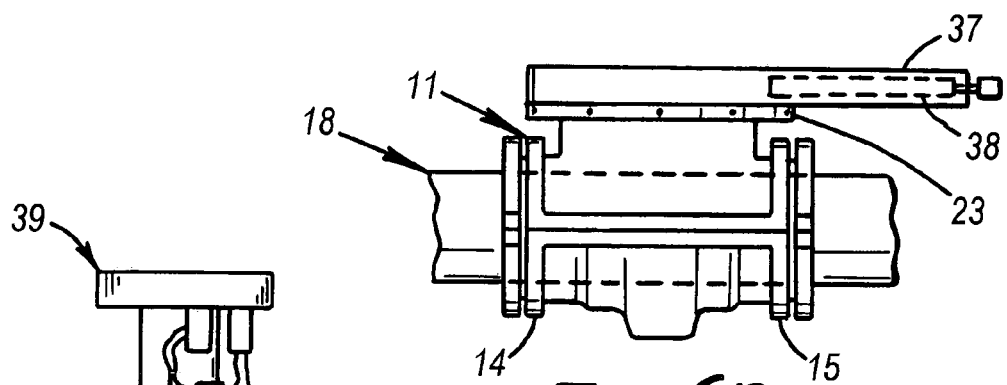

Installation includes mounting what is referred to herein as an isolation valve 37 on the bonnet-supporting flange 23 in a fluid-tight fit as depicted in FIG. 6B. The isolation valve 37 may take the form of a known type of gate valve having a gate 38 that can be closed to seal off the access opening 24 when desired during installation, and be opened to expose the access opening 24 in the bonnet-supporting flange 23. With the gate 38 in the open position depicted in FIG. 6B, the user can perform additional installation steps through the isolation valve 37. Preferably, the isolation valve 37 is removed after installation is complete as explained later on.

Figure 6C:
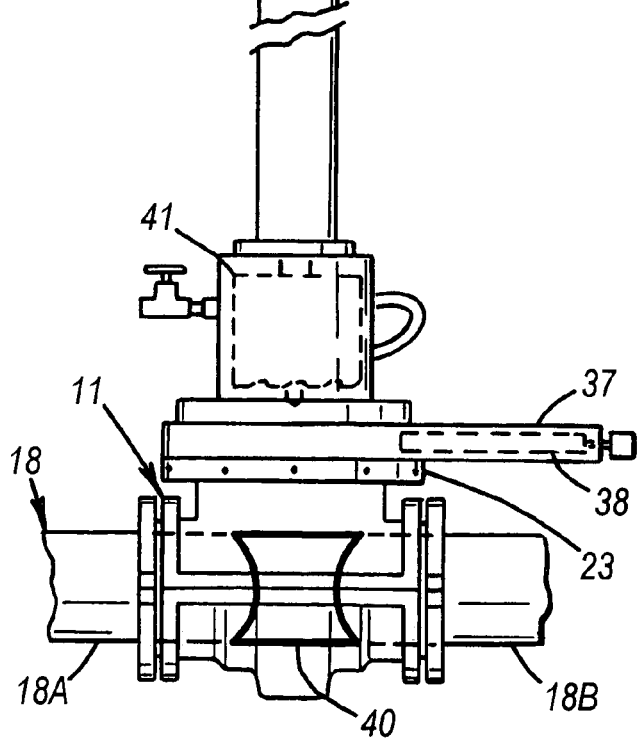

With the isolation valve 37 mounted on the bonnet-supporting flange 23, a tapping machine referred to herein as a hole saw apparatus 39 is mounted on the isolation valve 37 in a fluid-tight fit and used to cut out and remove a section 40 of the pipe 18 (identified with a bold outline in FIG. 6C). The hole saw apparatus 39 may take the form of a known type of tool that functions as pipe-cutting means. It is adapted to be mounted on the isolation valve 37 and functions as means for cutting and removing the whole section 40 of the existing pipe 18 through the isolation valve 37 and the access opening 24 in order to form the gate-receiving gap 18C.

Figure 6D:
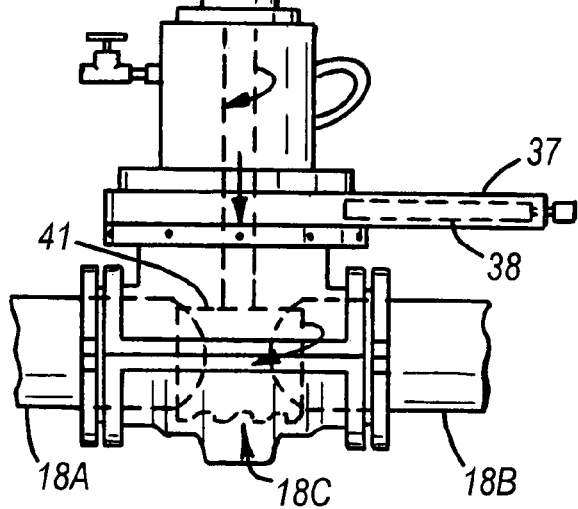

Cutting the pipe 18 with such a hole saw apparatus is sometimes referred to as "hot tapping." It is a known type of technology that is familiar to one of ordinary skill in the art. The hole saw apparatus 39 includes a cylindrically shaped cutting element 41 (e.g., a readily available cutting tip) having an outside diameter no less (preferably greater than) than the OD of the pipe 18. The hole saw apparatus 39 rotates the cutting element 41 as depicted in FIG. 6D (e.g., powered by a gasoline, electrical, hydraulic, or air engine) while advancing it through the isolation valve 37, through the access opening 24, and through the pipe 18 (e.g., in response to the user cranking a handwheel portion of the apparatus 39), thereby severing the pipe 18 by cutting out the section 40. Doing so forms the gate-receiving gap 18C between the two separate pipe sections 18A and 18B that is identified in FIGS. 6D–6K.

Figure 6E:
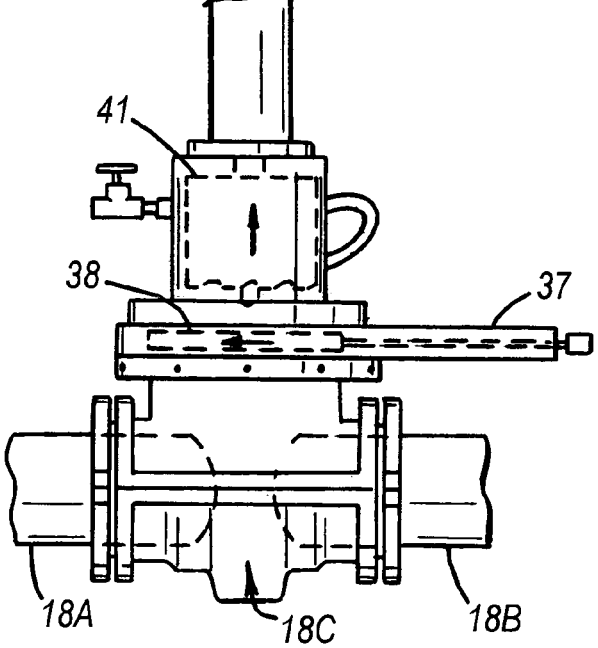

After the section 40 is cut, the cutting element 41 is withdrawn out of the valve body 11 through the access opening 24 and the isolation valve 37, along with the section 40 as depicted by FIG. 6E. The section 40 may be held by a pilot drill portion of the cutting element 41 that includes a known type of retention device so that the section 40 is withdrawn with the cutting element 41. Those details are known to one of ordinary skill in the art.

Figure 6F:
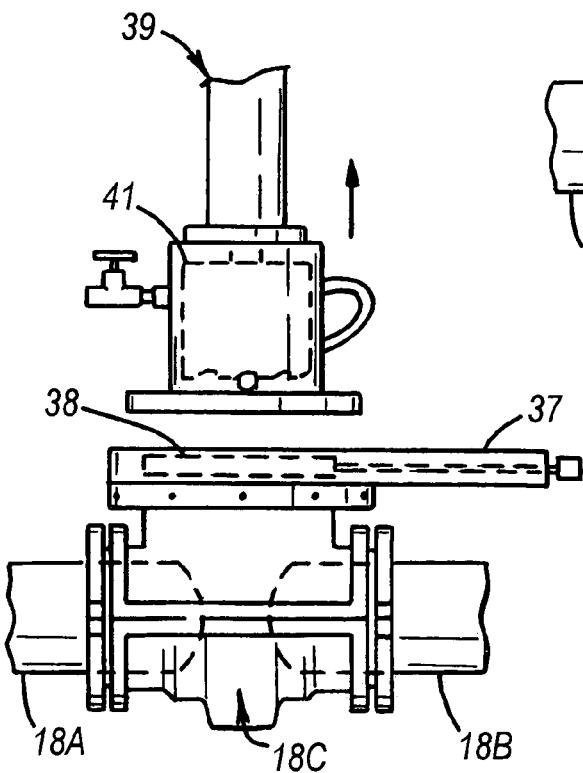
Figure 6G:
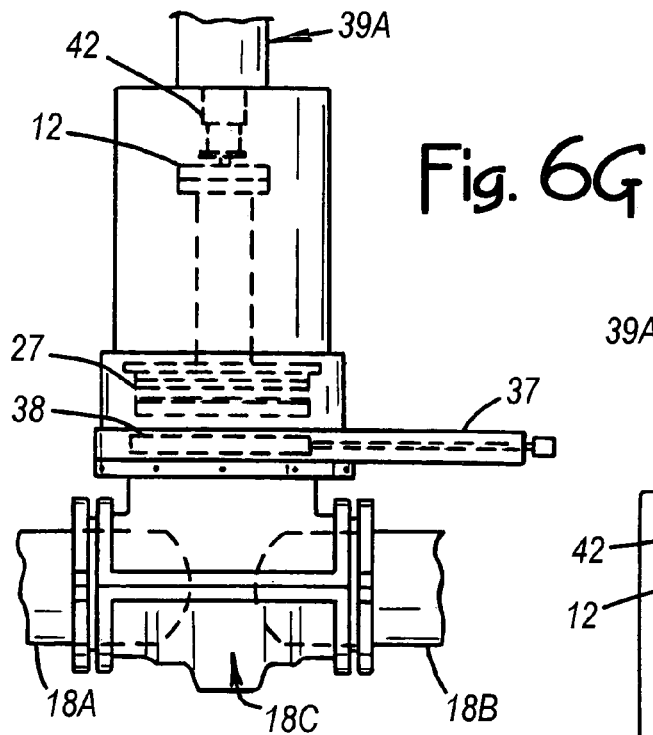
Figure 6H:
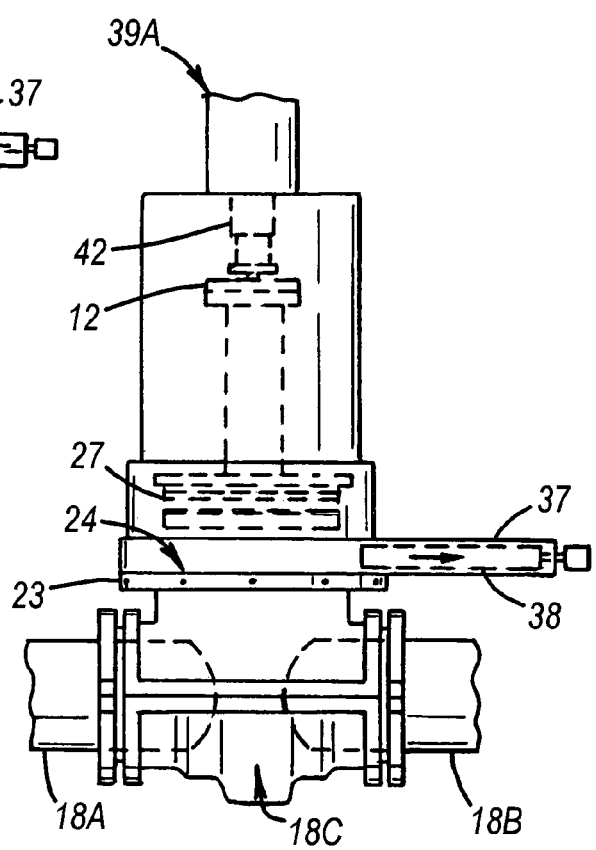
Figure 6I:
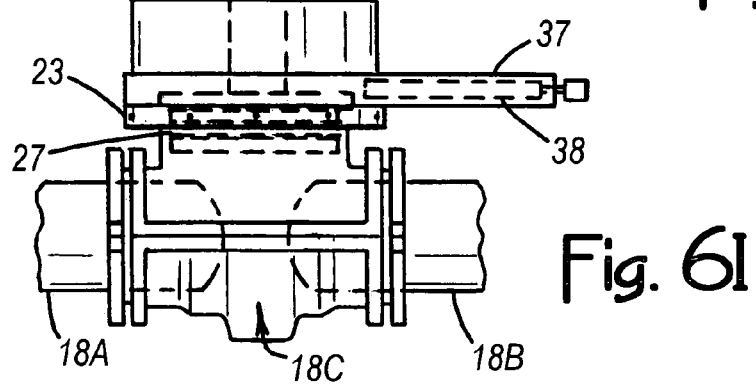

Next, the user closes the gate 38 of the isolation valve 37 and removes the hole saw apparatus 39 from the bonnet-supporting flange 23 as depicted by FIG. 6F. The cutting element 41 is then removed from the hole saw apparatus 39, a bonnet-holding device 42 is added to form a bonnet-mounting apparatus 39A as shown in FIGS. 6G, 6H, and 6I, and the bonnet-mounting apparatus 39A is mounted on the bonnet-supporting flange 23 in a fluid-tight fit. Designation by reference numeral 39A indicates that it is a modified version of the original hole saw apparatus 39, now having the bonnet-holding device 42 (identified in FIGS. 6G, 6H, and 6I).

Figure 2:
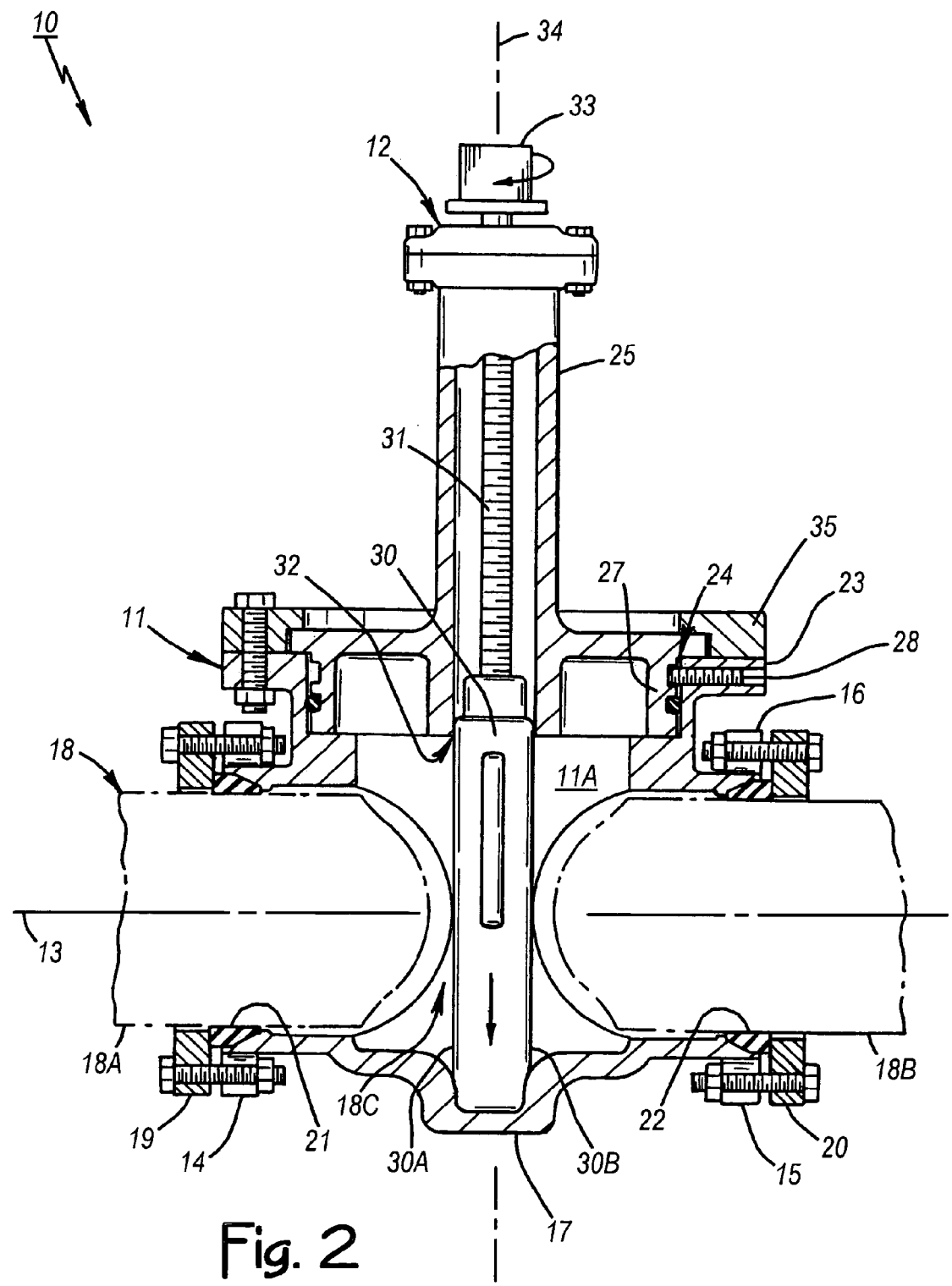
FIG. 2 is a cross sectional elevation view of the valve assembly as viewed in a vertical plane containing a line 2—2 in FIG. 1.
Figure 3:
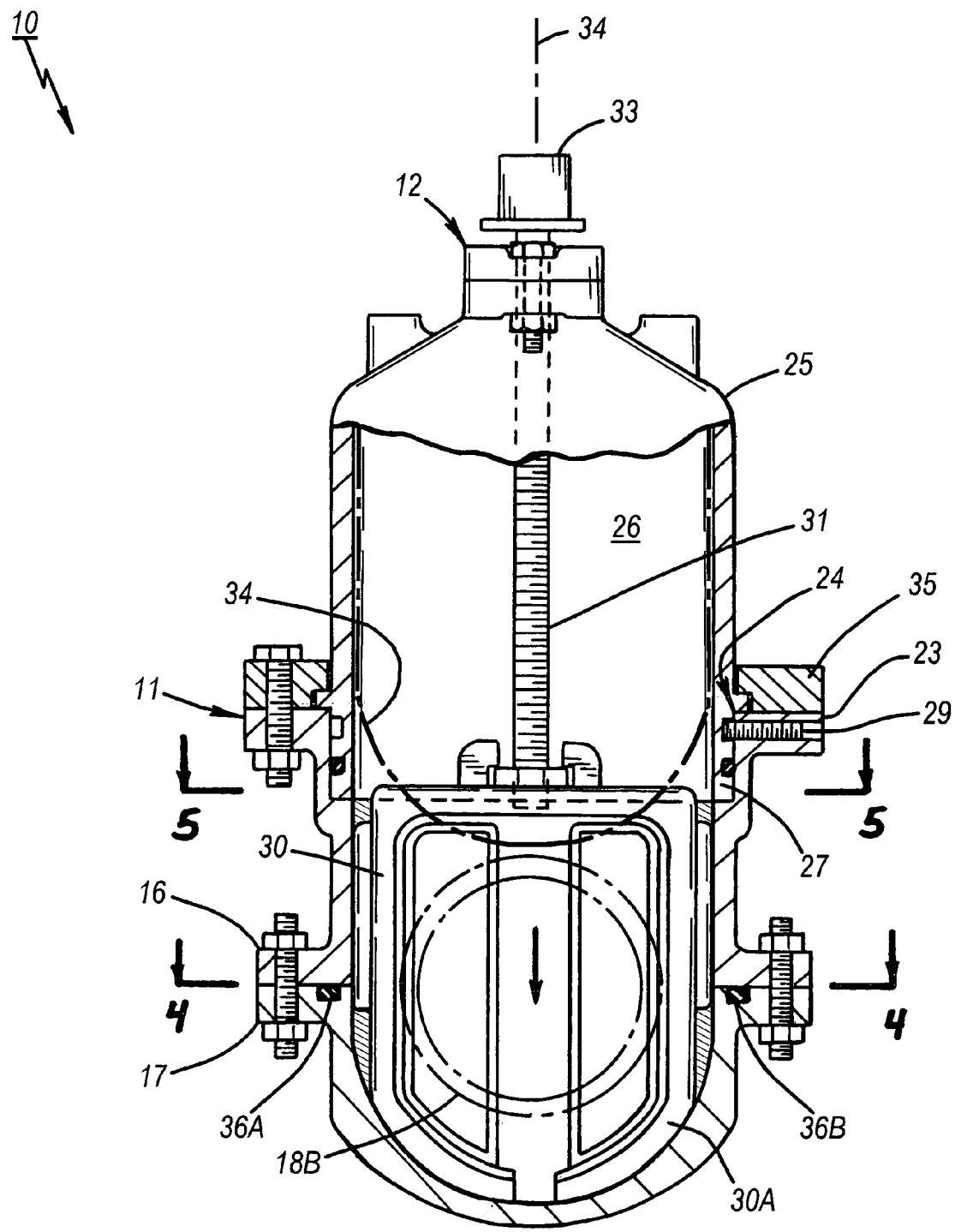
FIG. 3 is a cross sectional elevation view of the valve assembly as viewed in a vertical plane containing a line 3—3 in FIG. 1.
Figure 4:
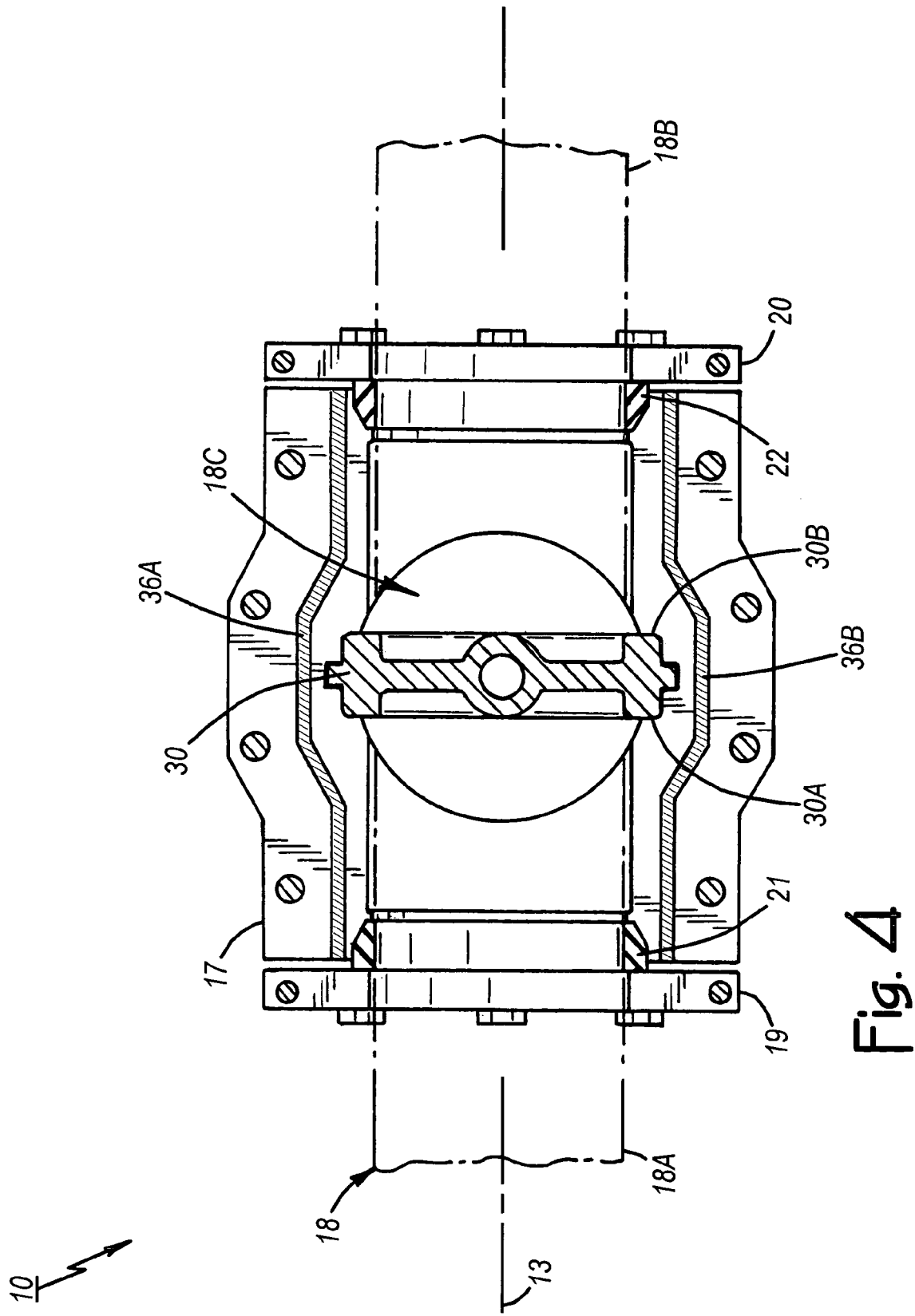
FIG. 4 is a cross sectional view of the valve assembly as viewed in a horizontal plane containing a line 4—4 in FIG. 3.
Figure 5:
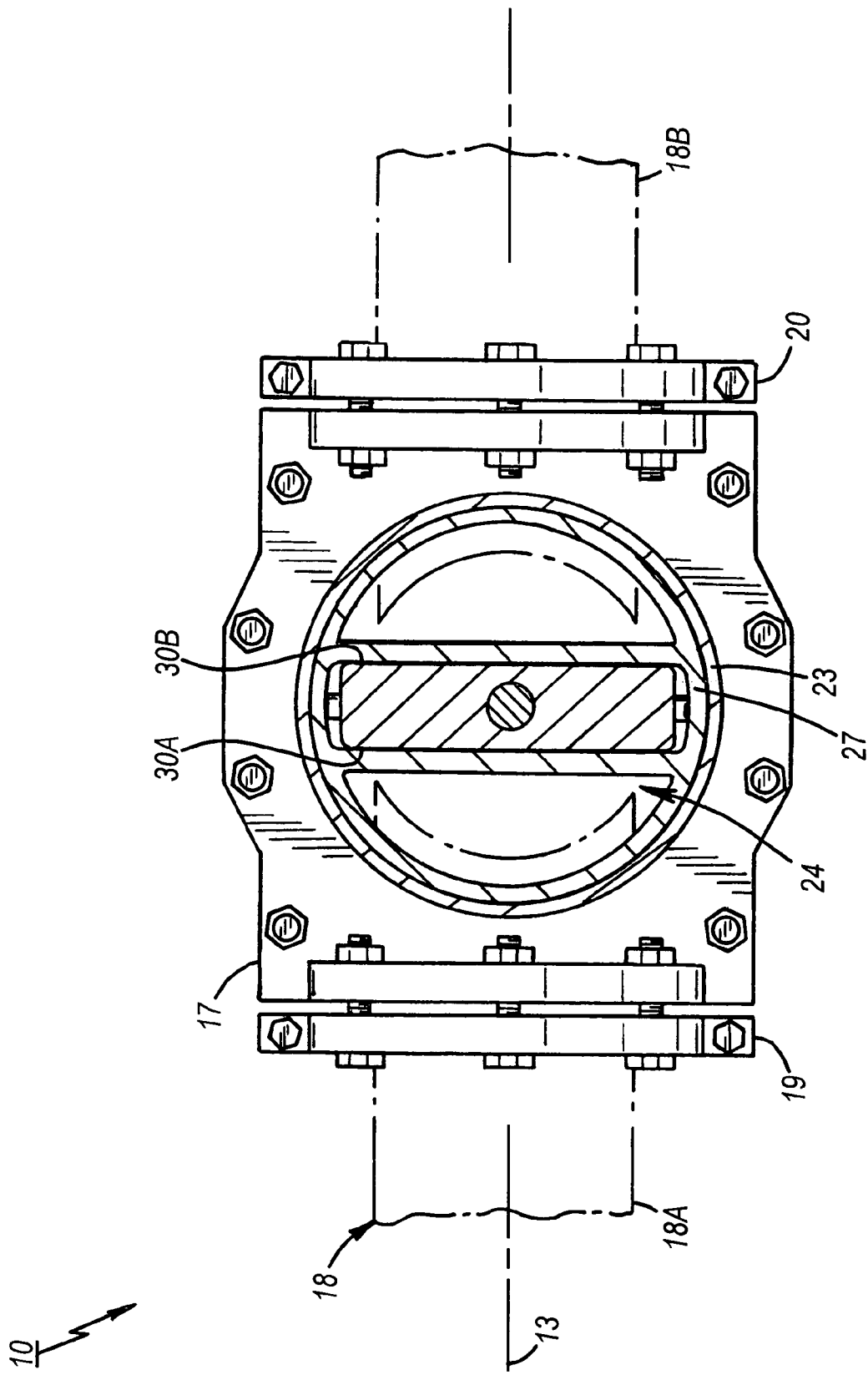
FIG. 5 is a cross sectional view of the valve assembly as viewed in a horizontal plane containing a line 5—5 in FIG. 3.

The bonnet-holding device 42 grips and holds the bonnet 12 while the bonnet-mounting apparatus 39A advances the bonnet 12 along the rotational axis identified in FIGS. 1–3 (after the gate 38 is re-opened as depicted in FIG. 6H), forcing the flange-mating portion 27 of the bonnet 12 into position in the access opening 24 defined by the bonnet-supporting flange 23 (identified in FIG. 6H). The user secures the flange-mating portion 27 with the set screws 28 and 29 (and others) mention previously with reference to FIGS. 2 and 3. Of course, any of various other forms of securing mechanisms may be used instead, including a mechanically sliding restraint that engages the flange-mating portion 27.

Thus, the bonnet-mounting apparatus 39A functions as bonnet-mounting means that is adapted to be mounted on the isolation valve 37. There, it functions as means for mounting the bonnet 12 on the bonnet-supporting flange 23 through the isolation valve 37. An entirely different apparatus can be used instead for mounting the bonnet 12 without departing from the invention. The above procedure makes use of the hole saw apparatus 39 for pipe-cutting and, after modification, for bonnet-mounting purposes.

Figure 6J:
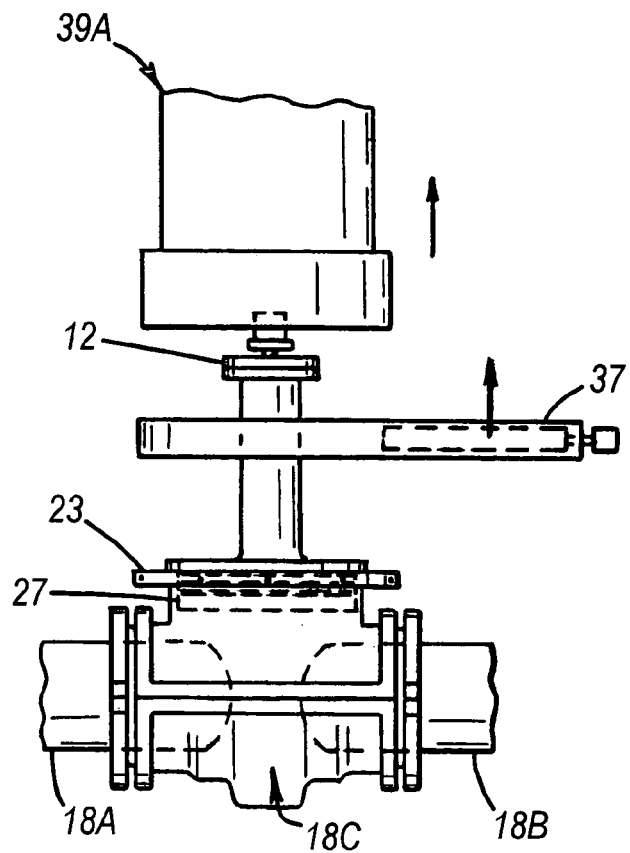
Figure 6K:
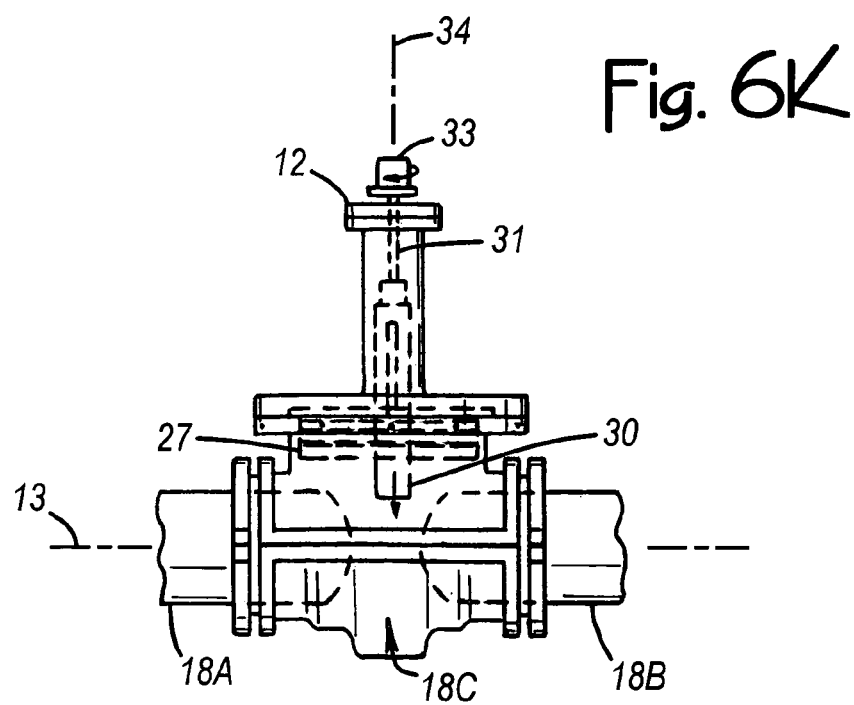

After the bonnet 12 is mounted, the bonnet-mounting apparatus 39A is removed from the isolation valve 37. The isolation valve 37 is also removed from the bonnet-supporting flange 23, up and over the bonnet 12 as depicted in FIG. 6J. Finally, the retaining ring 35 is bolted onto the bonnet-supporting flange 23 as depicted in FIG. 6K to result in a valve assembly installation according to the invention. The user or worker desiring to open and/or close the valve, accesses and rotates the square head 33 (e.g., clockwise to close and counterclockwise to open).

To summarize the above-described methodology, a method of inserting a valve in a line includes the step of providing the above-described (i) first or valve body subassembly, (ii) second or bonnet subassembly, (iii) isolation valve, (iv) pipe-cutting means, and (v) bonnet-mounting means. The method proceeds by assembling the valve body subassembly over the pipe, mounting the isolation valve on the flange, cutting and removing a section of pipe by using the pipe-cutting means through the isolation valve, and mounting the bonnet subassembly on the flange by using the bonnet-mounting means through the isolation valve (thereby allowing the valve body to become part of the gate sealing surface).

Thus, the method of this invention removes a whole section of the existing pipe in order to allow the gate to seat on its mating valve body casting. The valve structure allows that to be done. Doing so enable isolation of most any pipeline whether or not there is a gross amount of build up on the pipe interior and/or the pipe has an unusual pipe size and wall thickness. Some existing valve insertion techniques cut just a hole in the pipe in order to seat a gate against the interior of the existing pipe. Others cut a gap but insert a secondary valve structure in the gap. The present invention, however, cuts entirely through the existing pipe and advances a gate through the gap into direct fluid-tight engagement of the valve body, thereby resulting in a true valve. In addition, the valve assembly of this invention results in a mechanical seal around the existing pipe that contains fluid in the event of breakage of the existing pipe.

Turning now to FIGS. 7A, 7B, and 7C, they illustrate the valve body 11 diagrammatically in order to focus on important features of a valve body constructed according to the invention. The valve body 11 is shown assembled onto the pipe 18 in coaxial relationship relative to the valve body axis 13. The access-providing opening 24 (preferably circularly shaped) faces radially outward relative to the valve body axis 13. A central portion 11B of the hollow valve body interior 11A, that is identified in FIGS. 7A and 7B, extends downwardly from the access-providing opening 24 beyond the pipe 13 to a lower valve body surface 11C that is identified in FIGS. 7A, 7B, and 7C. The access-providing opening 24 and the central portion 11B are sufficiently large in cross section area to receive the circular hole-cutting element (the circular hole-cutting element having an OD no less than, and preferably more than, the OD of the pipe 13). A dimension 24A in FIG. 7B indicates the diameter of the access-providing opening 24 and that diameter is greater than the OD of the hole-cutting element so that the hole-cutting element can advance radially through the access-providing opening 24. So arranged, the hole-cutting element can pass entirely through the pipe 18 as the hole-cutting element advances radially (relative to the valve body axis 13) through the access-providing opening 24 and through the pipe 13.

Figure 8:
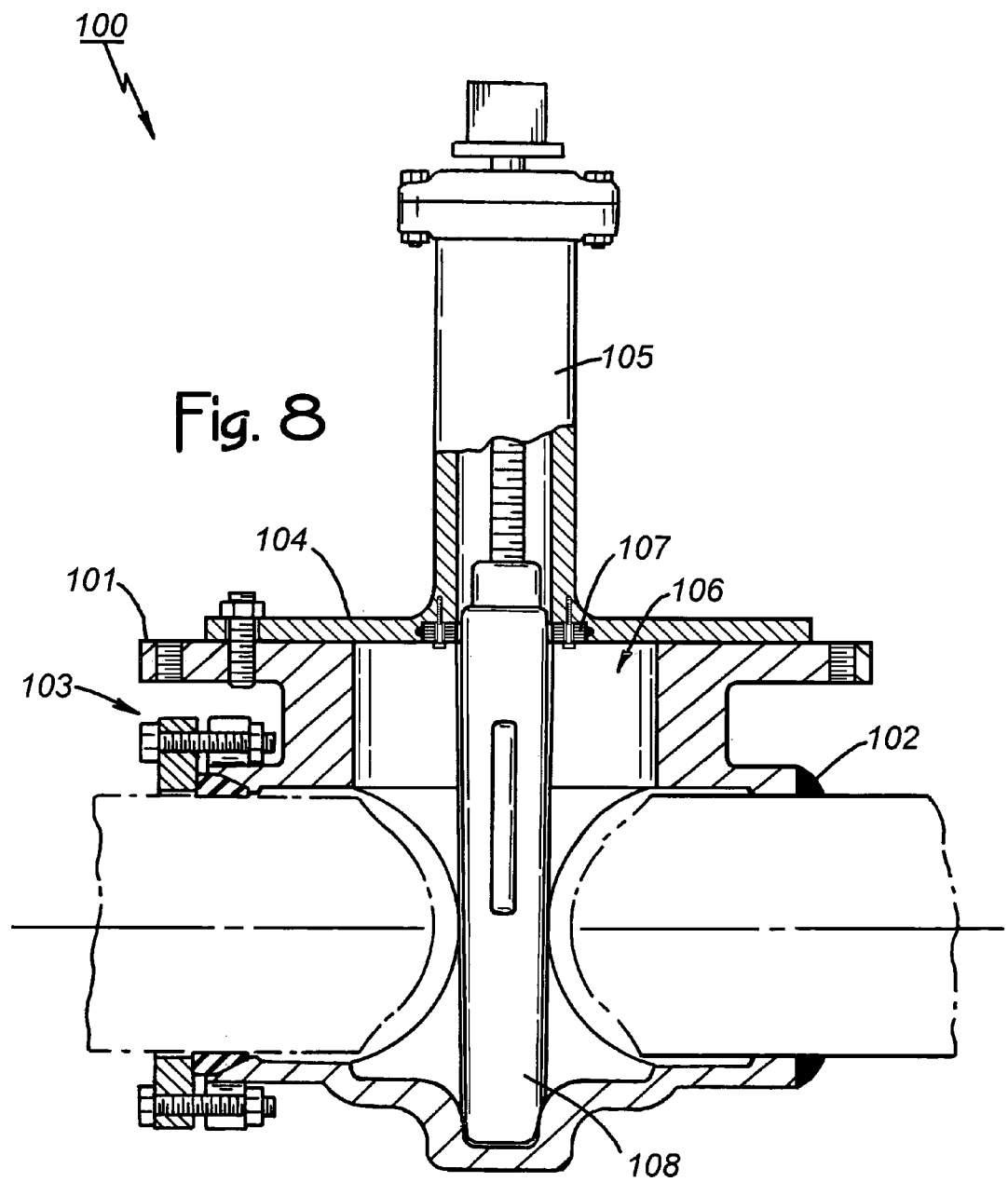
FIG. 8 is an elevation view similar to FIG. 2 that illustrates variations incorporated in a second embodiment of the invention.

Various alternative valve structures are shown in FIGS. 8 through 22. FIG. 8 shows a second embodiment of the invention in the form of a valve assembly 100. The valve body 101 of the valve assembly 100 illustrates that it may be installed by welding (e.g., weld at reference numeral 102) or be bolted together (e.g., as illustrated at reference numeral 103). The flange-mating portion 104 of the bonnet 105 mounts over the access opening 106 in a fluid-tight fit without fitting into the access opening. The bonnet-to-gate sealing surface is provided by a sealing member 107 that is removably attached by bolting internally. The sealing member 107 also provides an opening (a gate opening) through which the gate 108 extends from the bonnet 105 in a fluid-tight fit.

FIG. 9 shows a third embodiment of the invention in the form of a valve assembly 110. It is similar to the valve assembly 100, but the bonnet 111 bolts internally to a flange-mating portion 112, and the flange-mating portion 112 bolts onto the flange 113, over the access opening 114, without fitting into the access opening. The flange-mating portion 112 provides an opening (a gate opening) through which the gate 115 extends in a fluid-tight fit. It also provides a bonnet-to-gate sealing surface. Having the bonnet 111 so it can be unbolted, allows installing a tapered gate during manufacturing that is wider at one end than the bonnet-to-gate sealing surface, thereby creating a tighter seal.

Figure 10A:
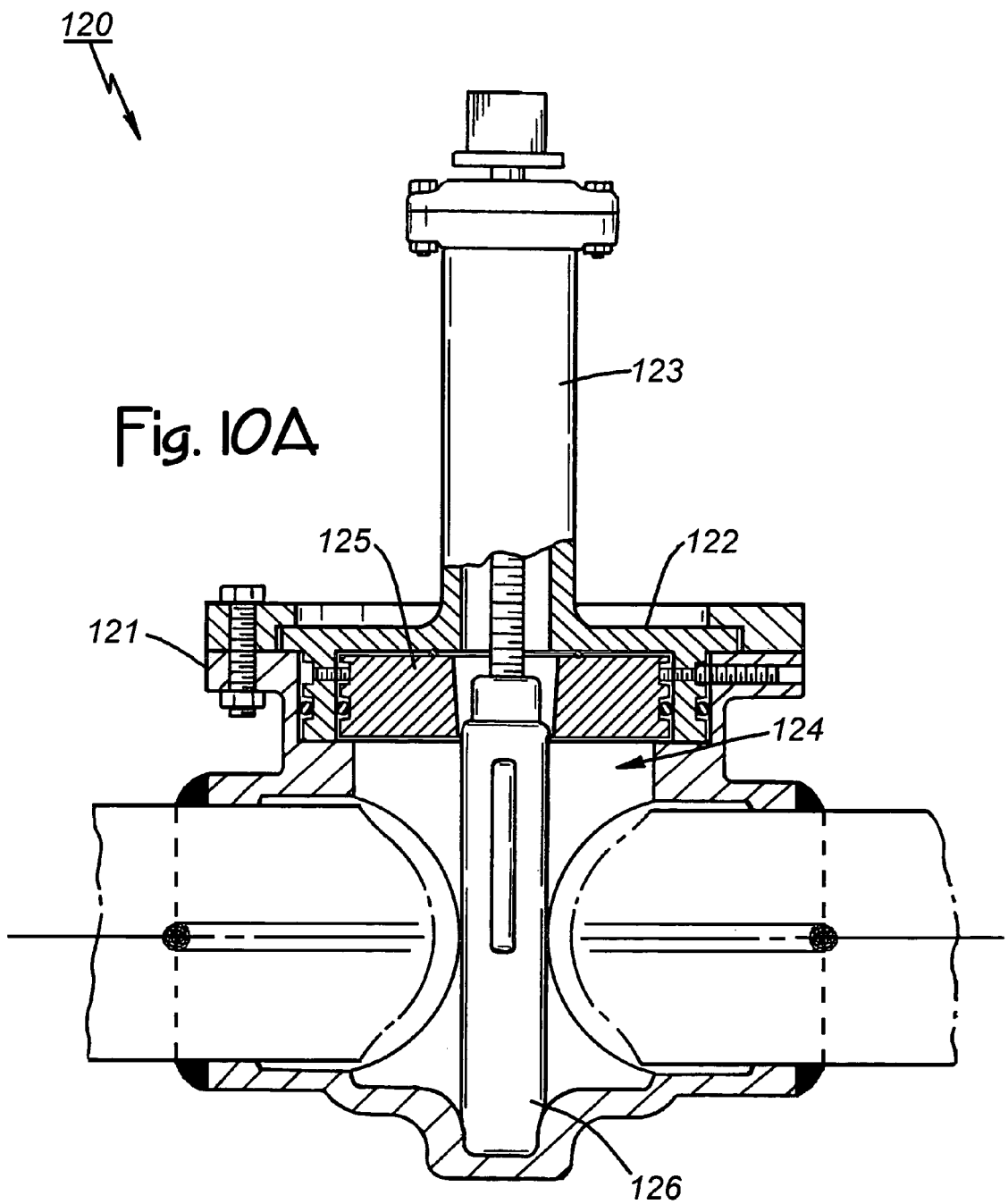
FIG. 10A is an elevation view similar to FIG. 2 that illustrates variations incorporated in a fourth embodiment of the invention.
Figure 10B:
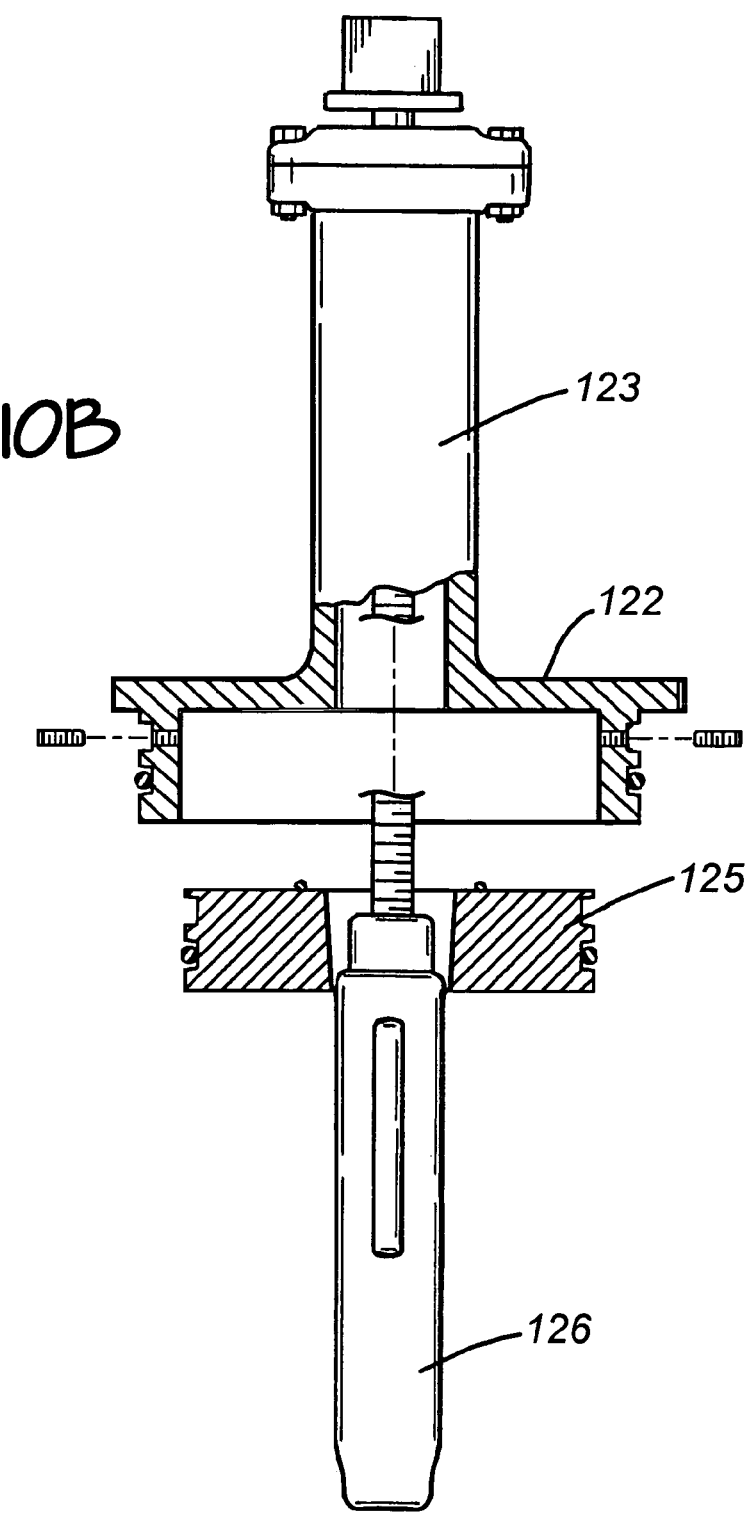
FIG. 10B is an exploded view showing assembly details of the fourth embodiment.

FIGS. 10A and 10B show a fourth embodiment of the invention in the form of a valve assembly 120. The valve body 121 is installed by welding, although it could be assembled using bolts or other suitable means. The flange-mating portion 122 of the bonnet 123 fits into the access opening 124. Bonnet-to-gate sealing is achieved by a sealing member 125 that is mounted on the flange-mating portion 122 with a set screw arrangement, although segmented rings can be used instead. The gate 126 extends through the sealing member 125.

Figure 11:
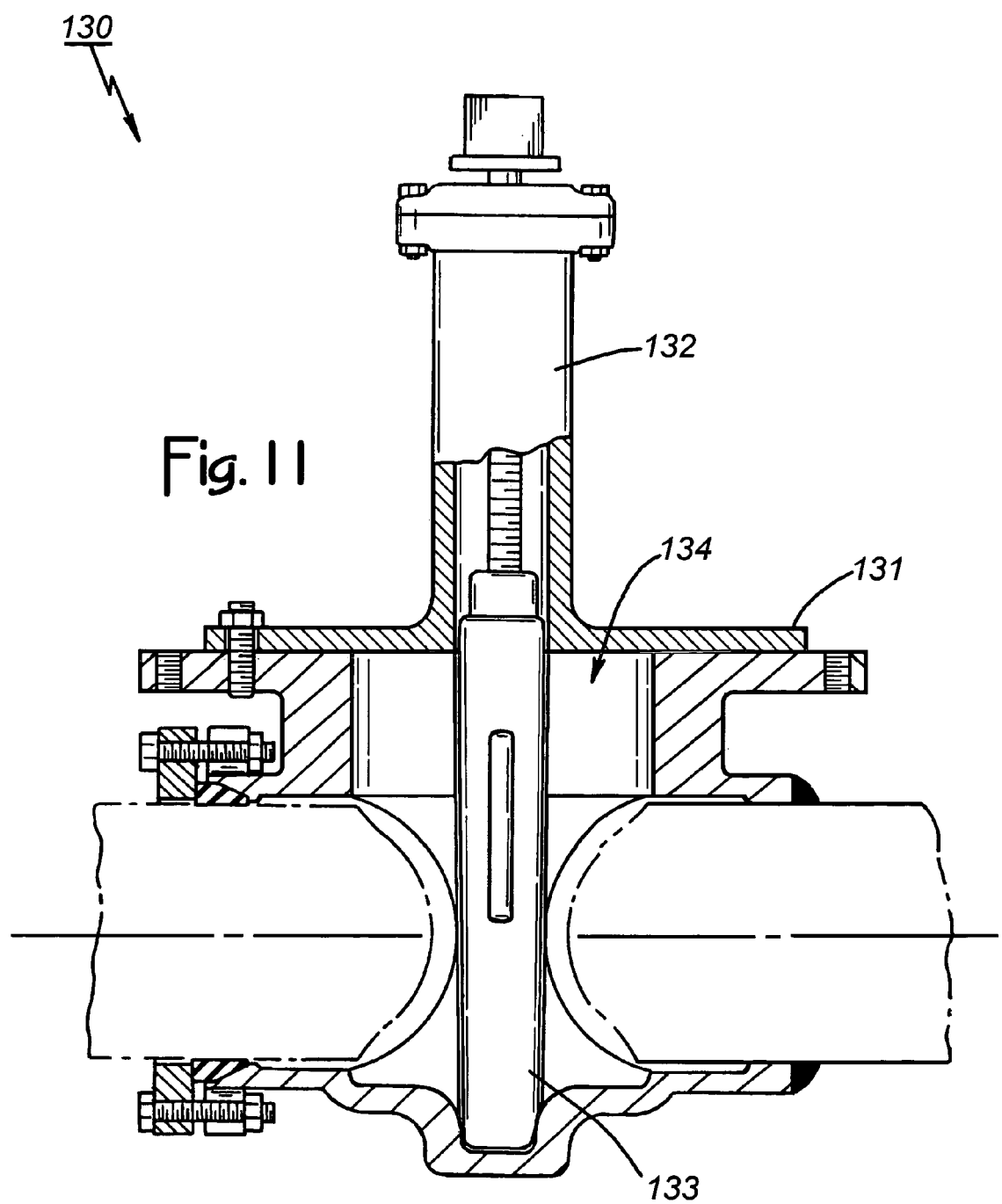
FIG. 11 is an elevation view similar to FIG. 2 that illustrates variations incorporated in a fifth embodiment of the invention.

FIG. 11 shows a fifth embodiment of the invention in the form of a valve assembly 130. The valve assembly 130 does not include a separate sealing member attached to the flange-mating portion 131 of the bonnet 132. The gate 133 extends through and seals directly against the flange-mating portion 131 without a separate bonnet-to-gate sealing member being needed. The flange-mating portion 131 mounts over the access opening 134 in a fluid-tight fit without fitting into the access opening.

Figure 12:
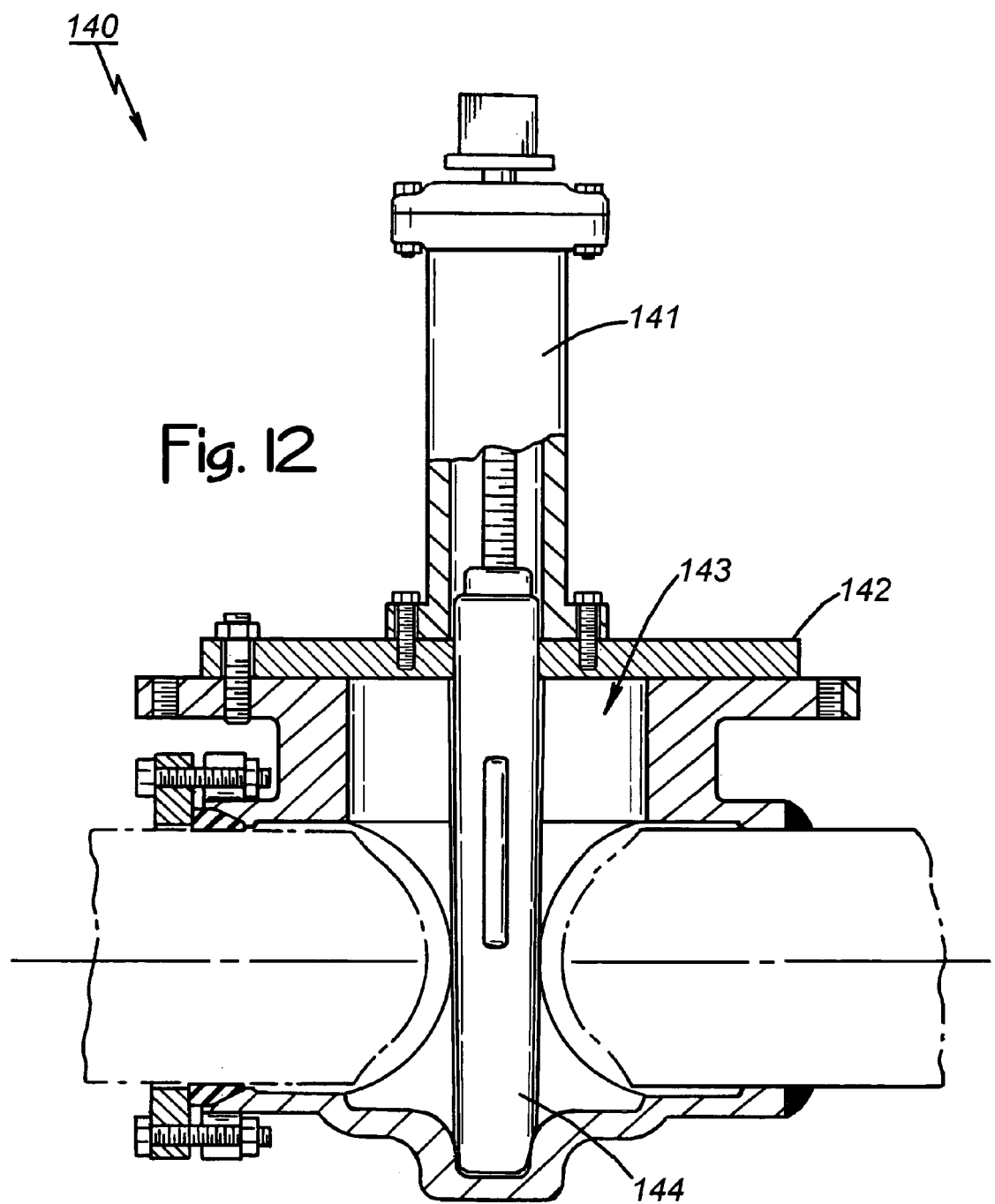
FIG. 12 is an elevation view similar to FIG. 2 that illustrates variations incorporated in a sixth embodiment of the invention.

FIG. 12 shows a sixth embodiment of the invention in the form of a valve assembly 140. It is similar to the valve assembly 110 in FIG. 9, but bonnet 141 is bolted externally to the flange-mating portion 142. The flange-mating portion 142 mounts over the access opening 143 in a fluid-tight fit without fitting into the access opening. The gate 144 extends through and seals directly against the flange-mating portion 142 without a separate sealing member being needed.

Figure 13:
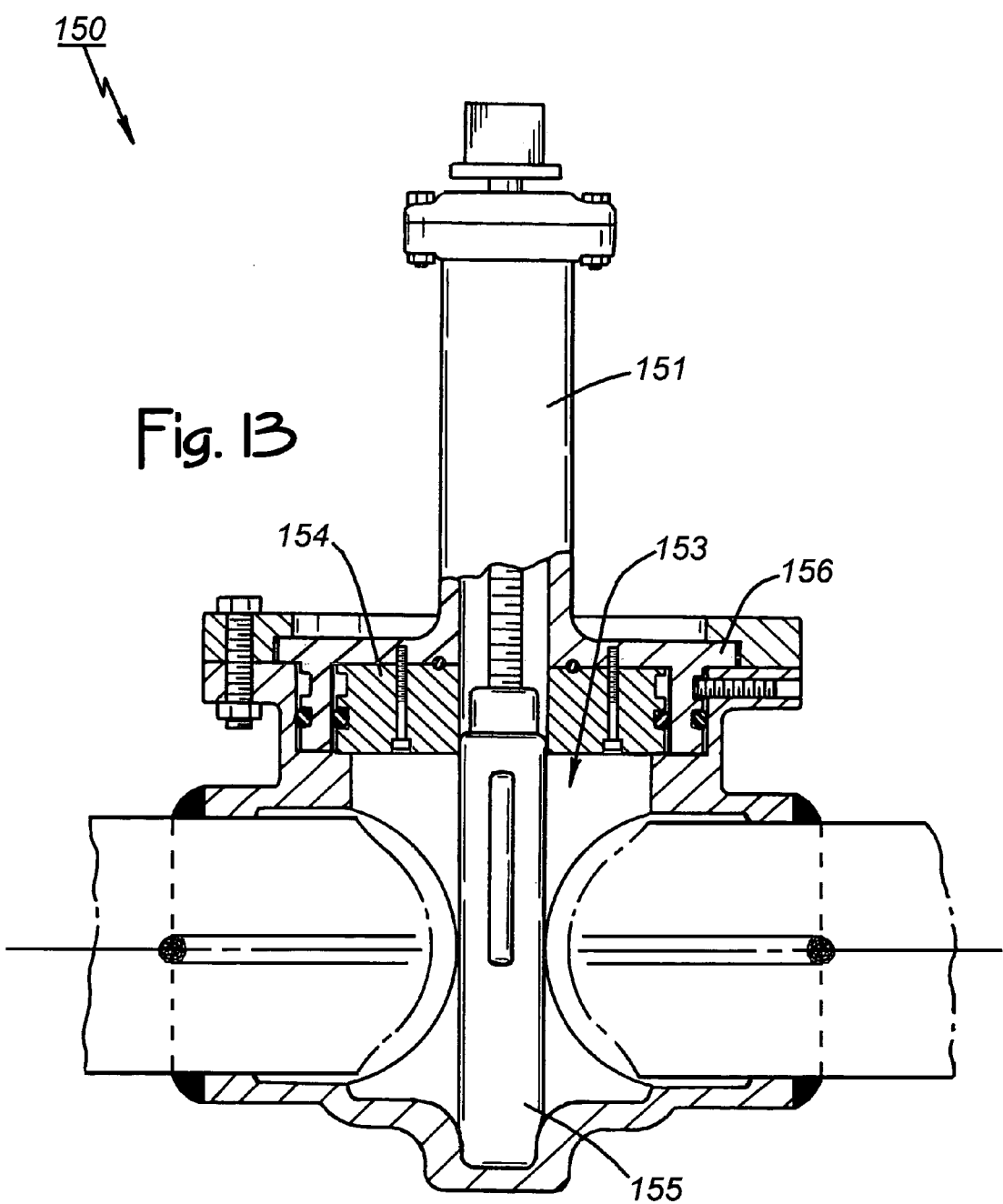
FIG. 13 is an elevation view similar to FIG. 2 that illustrates variations incorporated in a seventh embodiment of the invention.
Figure 14:
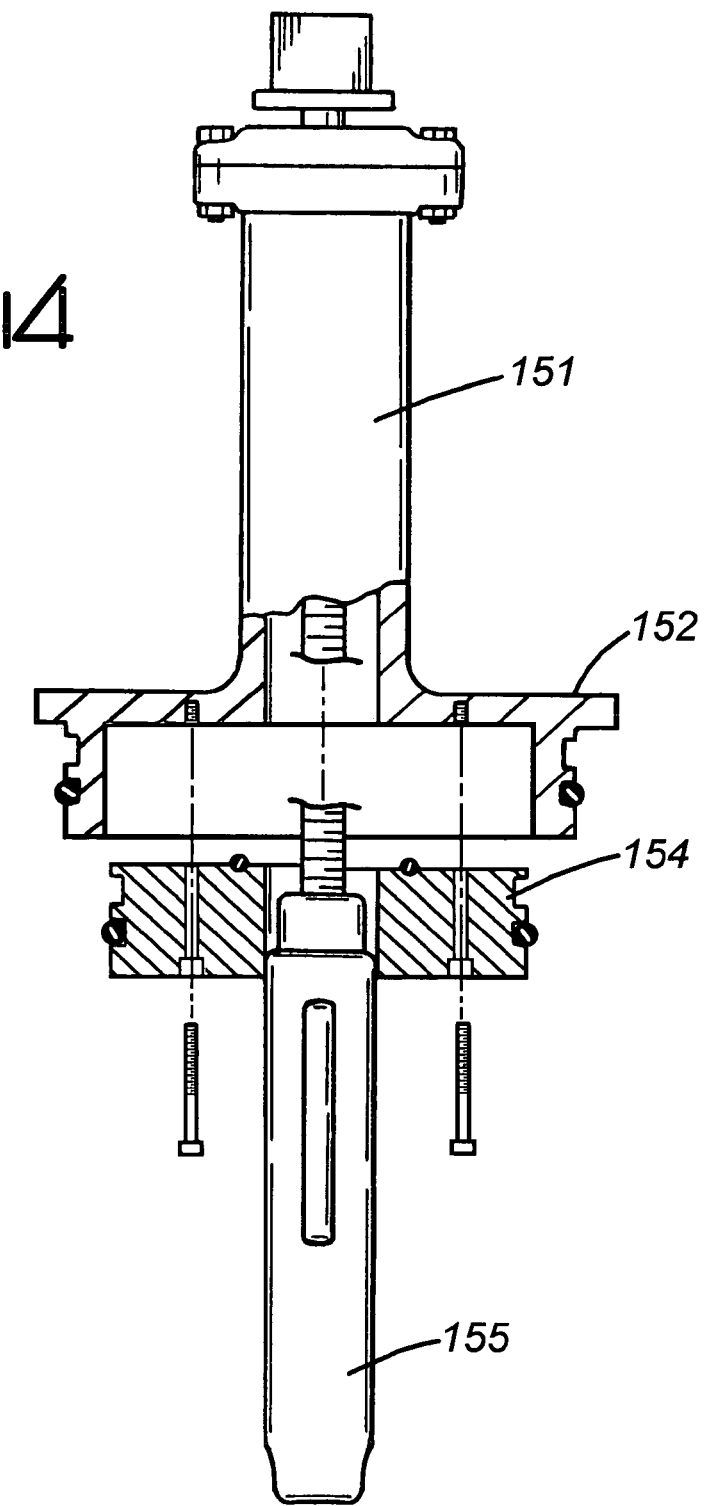
FIG. 14 is an exploded view showing assembly details of the seventh embodiment.

FIGS. 13 and 14 show a seventh embodiment of the invention in the form of a valve assembly 150. It is similar to the valve assembly 120 in FIGS. 10A and 10B, with the bonnet 151 including a flange-mating portion 152 that fits into the access opening 153 in a fluid-tight fit. However, the bonnet-to-gate sealing member 154 is removably mounted by internal bolts. It provides a gate opening through which the gate 155 extends in a fluid-tight fit.

Figure 15:
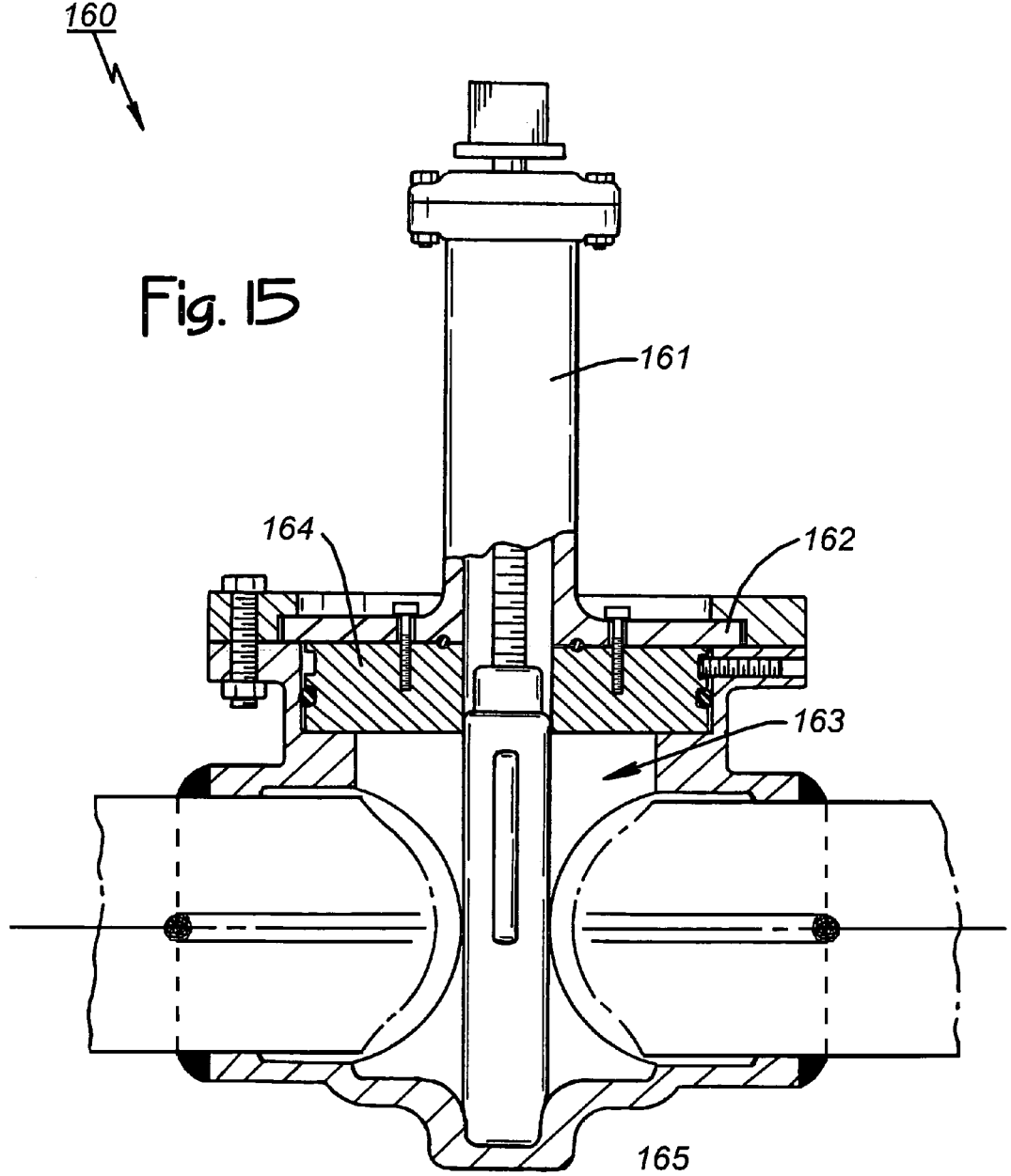
FIG. 15 is an elevation view similar to FIG. 2 that illustrates variations incorporated in an eighth embodiment of the invention.
Figure 16:
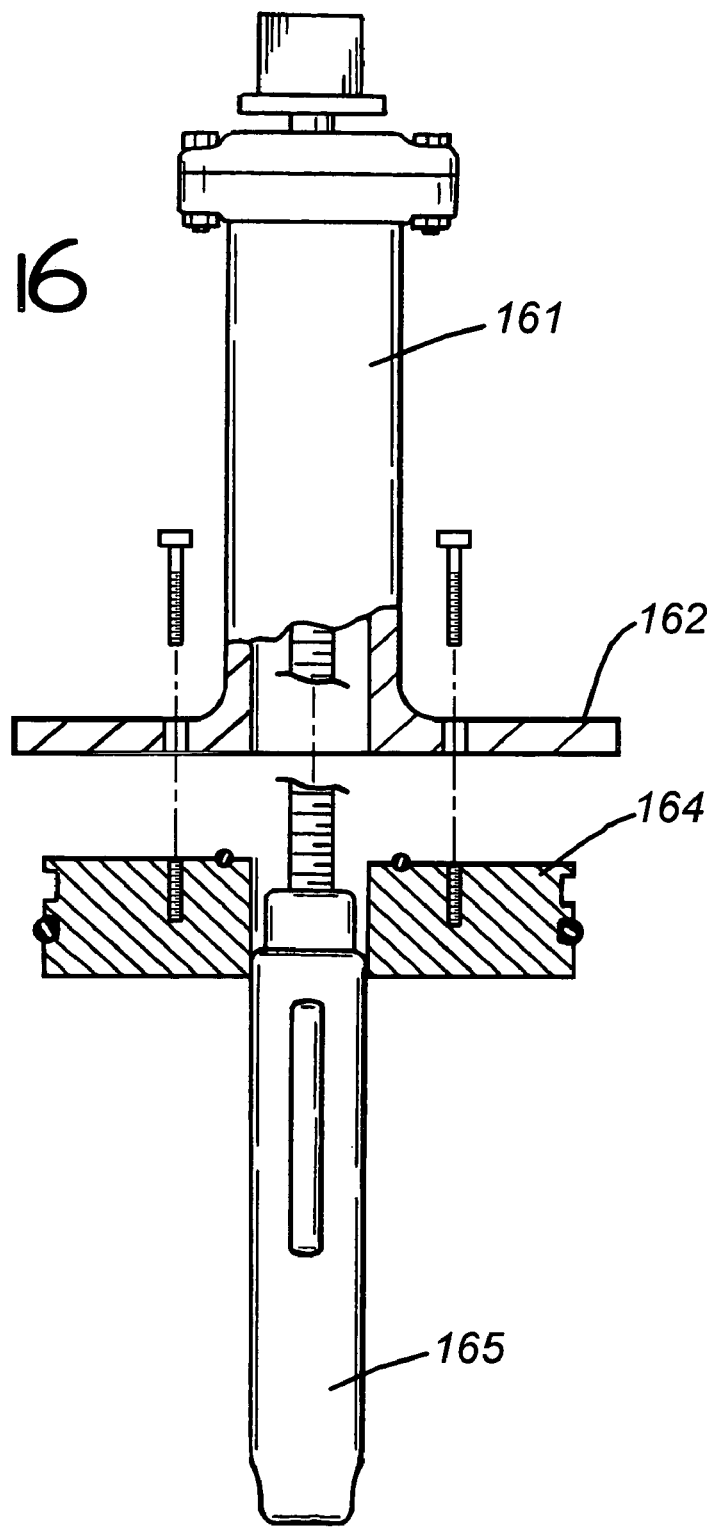
FIG. 16 is an exploded view showing assembly details of the eighth embodiment.

FIGS. 15 and 16 show an eighth embodiment of the invention in the form of a valve assembly 160. It is similar to the valve assembly 150 in FIGS. 13 and 14, with the bonnet 161 including a flange-mating portion 162 that fits over the access opening 163. The bonnet-to-gate sealing member 164 is bolted externally to the flange-mating portion 162, and it fits into the access opening 163 in a fluid-tight fit. The bonnet-to-gate sealing member 164 provides a gate opening through which the gate 165 extends in a fluid-tight fit.

Figure 17:
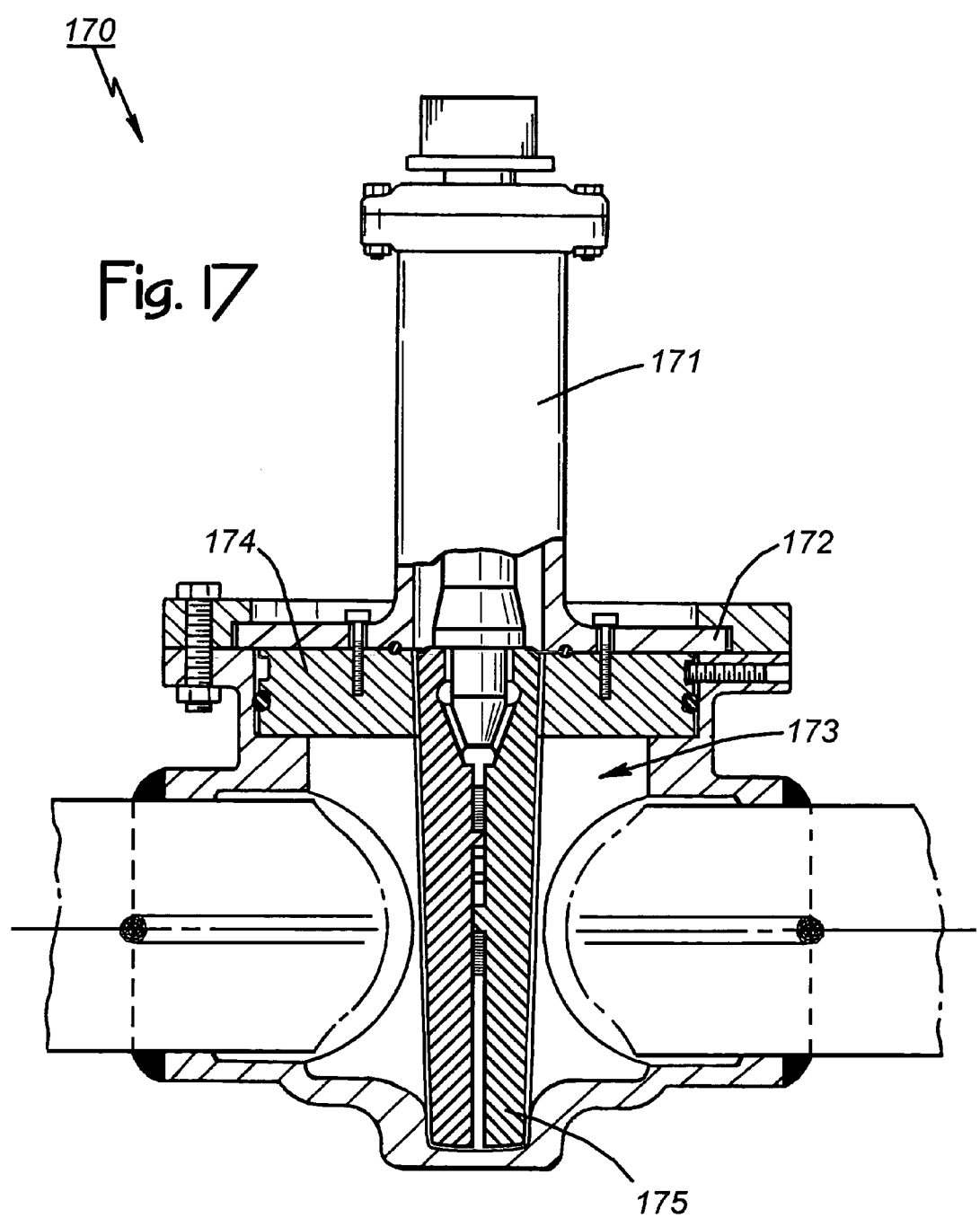
FIG. 17 is an elevation view similar to FIG. 2 that illustrates variations incorporated in a ninth embodiment of the invention.
Figure 18:
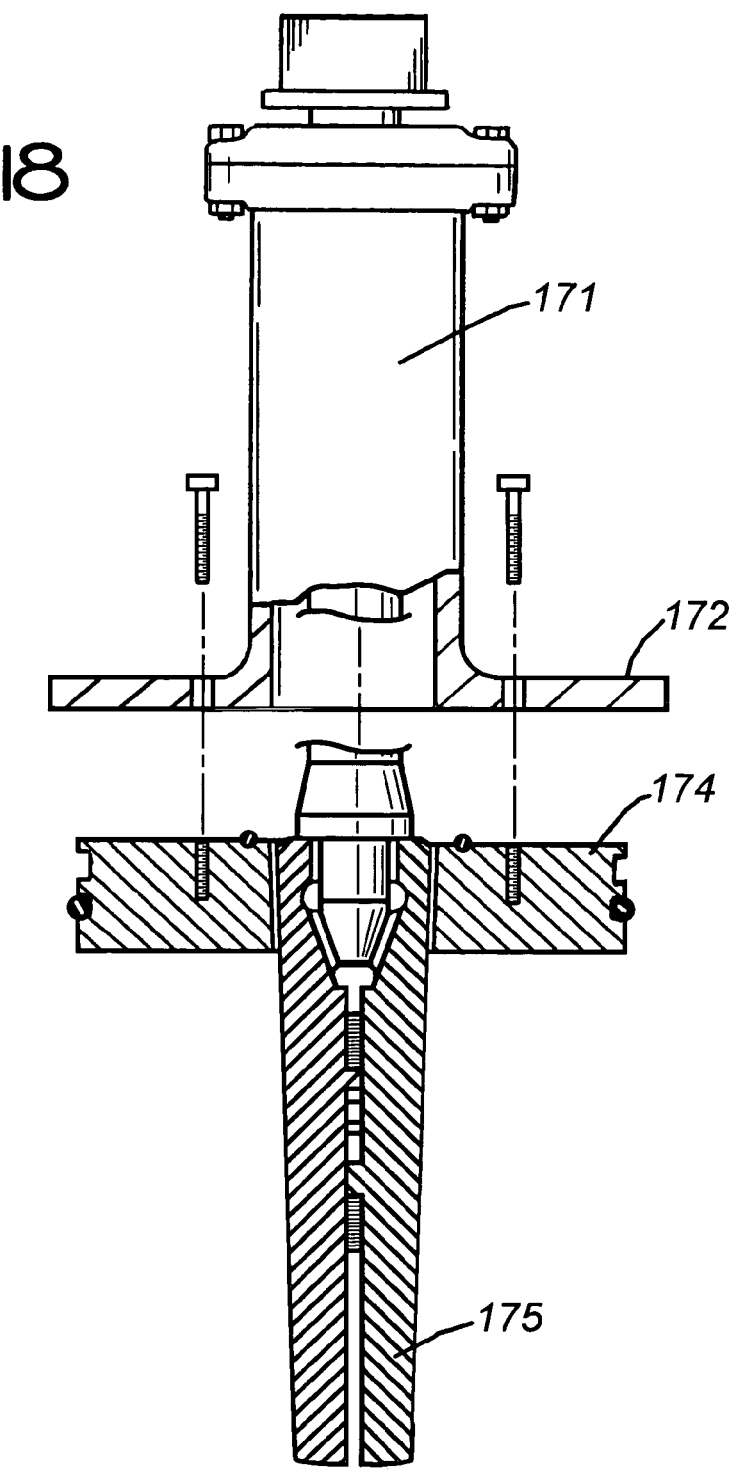
FIG. 18 is an exploded view showing assembly details of the ninth embodiment.

FIGS. 17 and 18 show a ninth embodiment of the invention in the form of a valve assembly 170. It is similar in some respects to the valve assembly 160 in FIGS. 15 and 16, with the bonnet 171 including a flange-mating portion 172 that fits over the access opening 173. In addition, the bonnet-to-gate sealing member 174 is bolted externally to the flange-mating portion 172, and it fits into the access opening 173 in a fluid-tight fit. However, the gate 175 is a double-disc seating gate having dual discs that are spread to effect a seal. The gate 175 allows a metal-to-metal seated assembly utilizing any of the valve bodies described herein. It helps to seal without elastomer compounds.

FIGS. 19, 20, 21, and 22 show tenth, eleventh, twelfth, and thirteenth embodiments of the invention in the form of valve assemblies 181, 182, 183, and 184. Each of the valve assemblies 181–184 includes a respective one of sealing members 181A, 182A, 183A, and 184A. Each of the sealing members 181A–184A provides a gate opening through which a respective one of the gates 181B, 182B, 183B, and 184B extends in a fluid tight fit.

Figure 19:
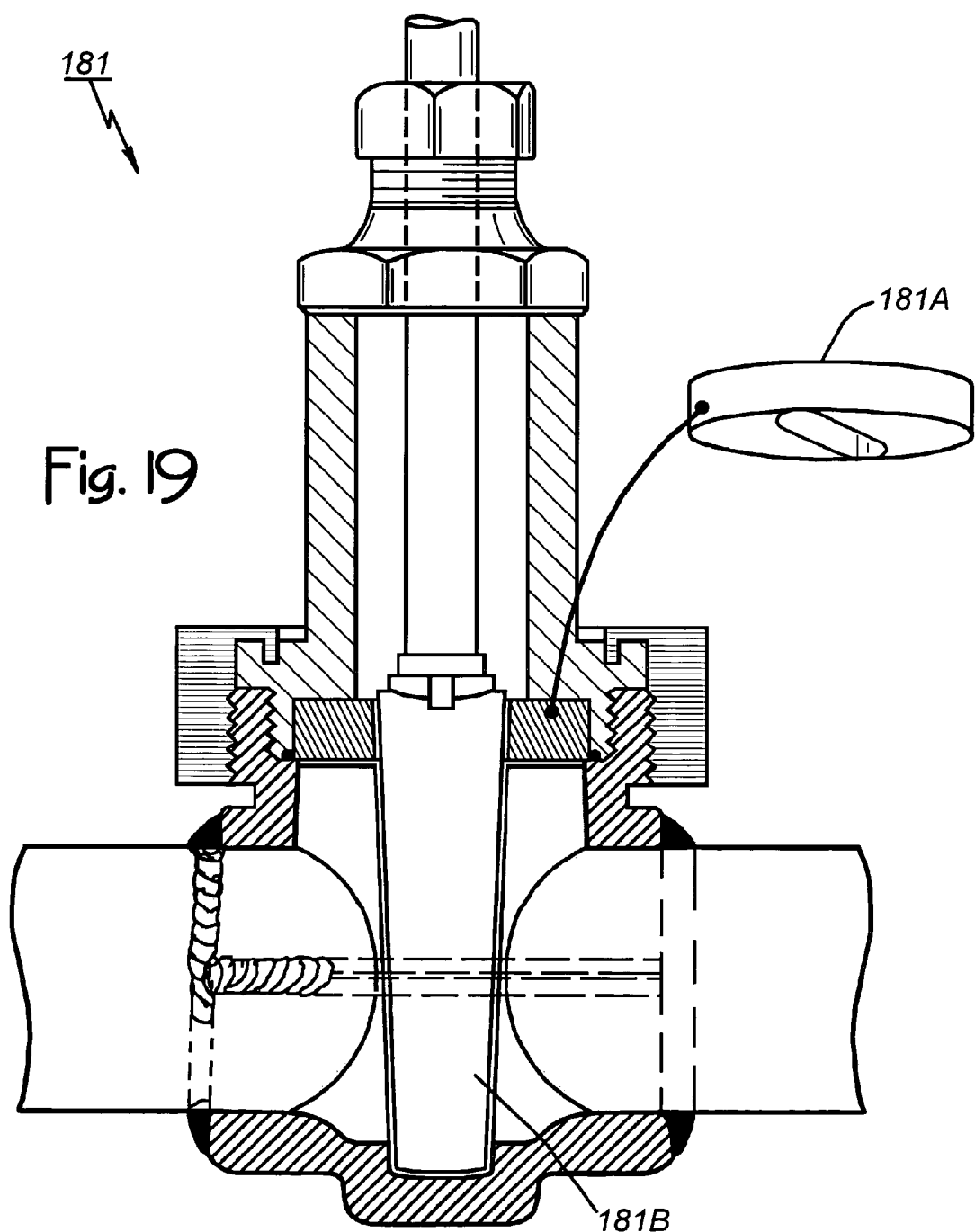
FIG. 19 is an elevation view similar to FIG. 2 that illustrates variations incorporated in a tenth embodiment of the invention.
Figure 20:
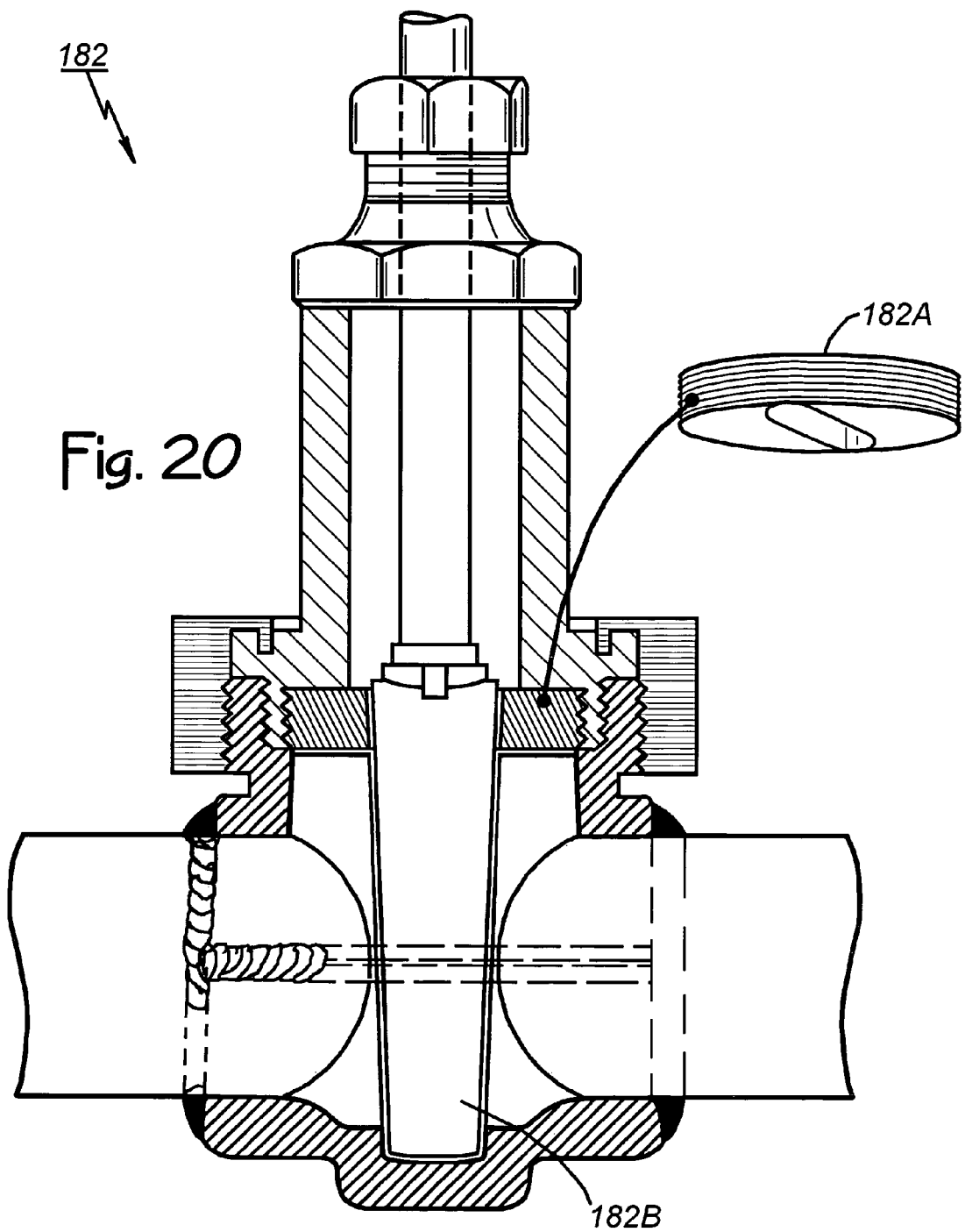
FIG. 20 is an elevation view similar to FIG. 19 that illustrates variations incorporated in an eleventh embodiment of the invention.
Figure 21:
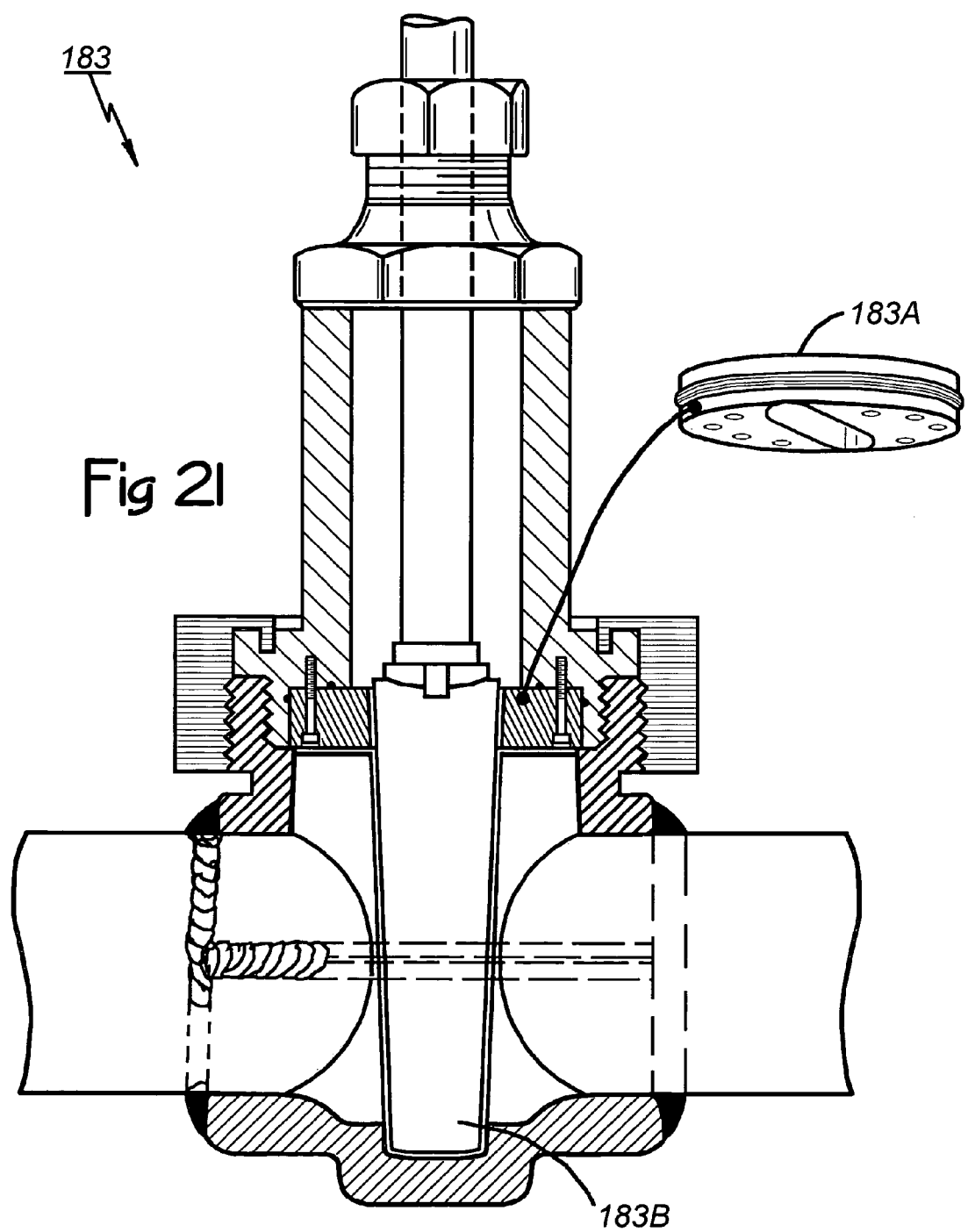
FIG. 21 is an elevation view similar to FIG. 19 that illustrates variations incorporated in a twelfth embodiment of the invention.
Figure 22:
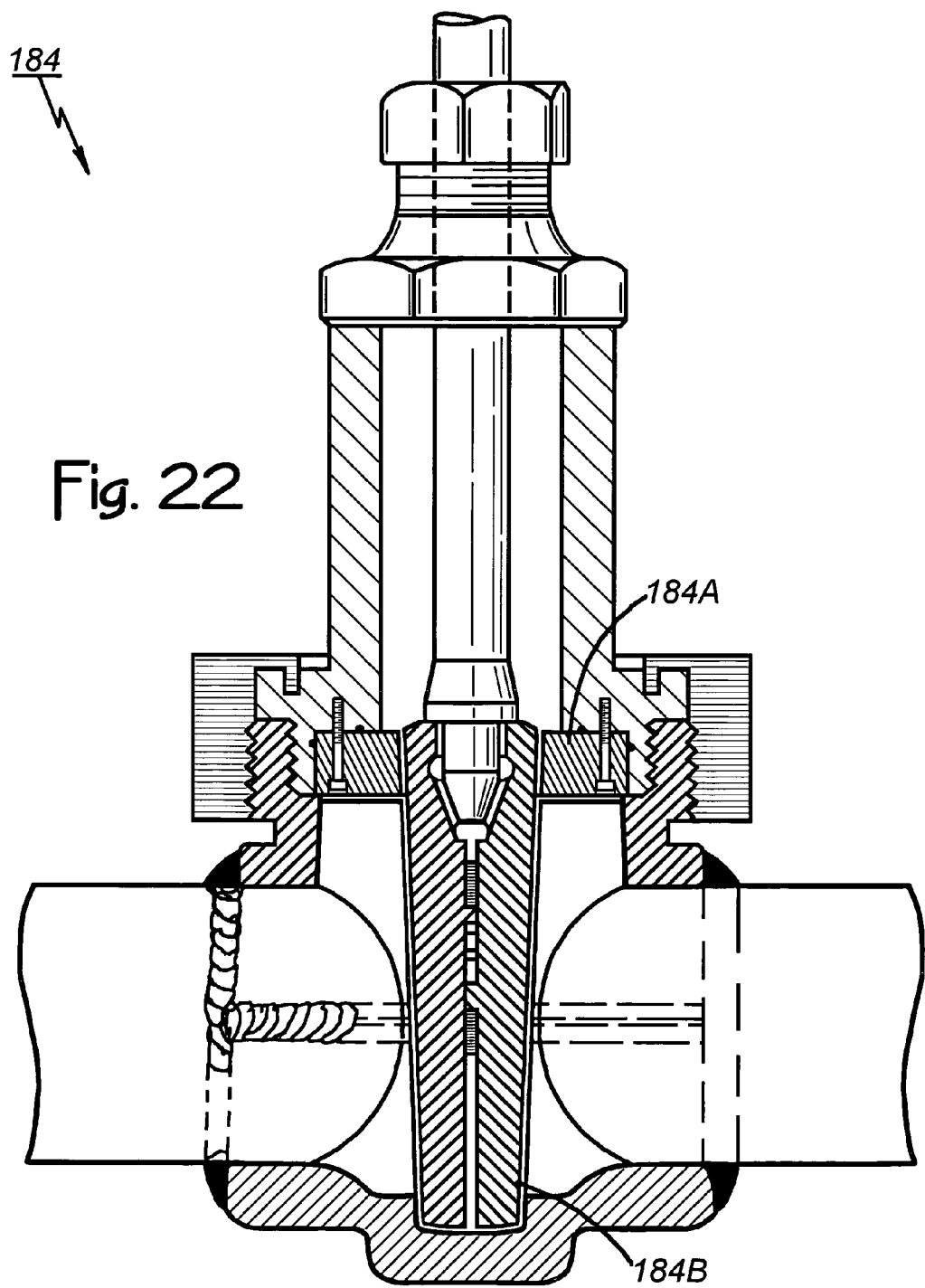
FIG. 22 is an elevation view similar to FIG. 19 that illustrates variations incorporated in a thirteenth embodiment of the invention.

The sealing member 181A in FIG. 19 is permanently installed during manufacturing. It allows installation of a tapered gate 181B during manufacturing. The gate 181B is wider at one end than the bonnet-to-gate sealing surface in order to create a tighter seal. The gate 181B is installed and then the bonnet-to-gate sealing member 181A is installed over the gate 181B and welded into place. The externally threaded sealing member 182A in FIG. 20 is similar to the sealing member 181A, but it is installed during manufacturing by threaded engagement. The sealing member 183A is installed during manufacturing by bolting. The sealing member 184A is also bolted in place, but it is configured to receive a double-disc gate 184B.

Figure 23:
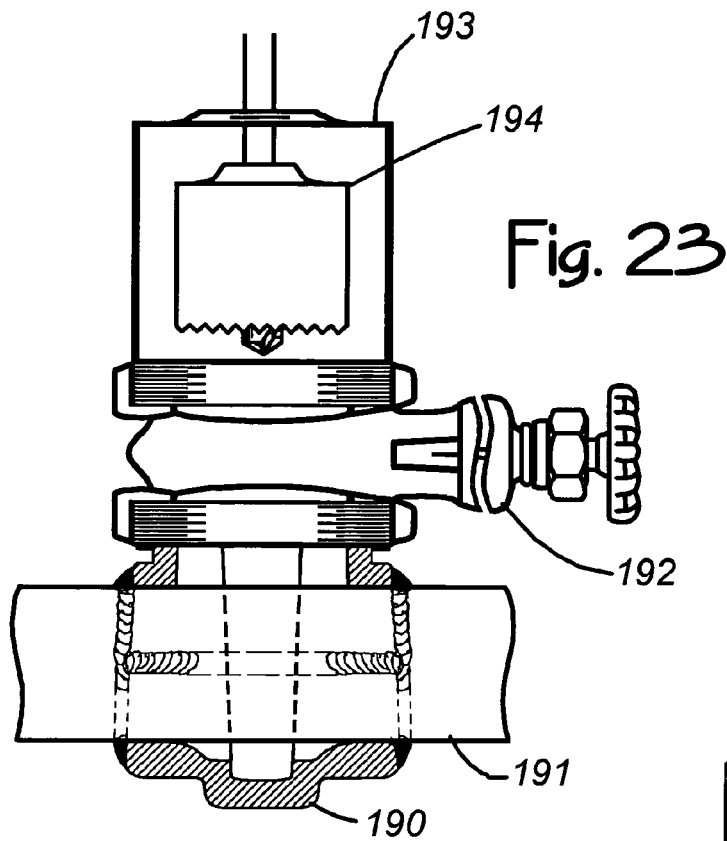
FIGS. 23–28 are additional diagrammatic representations of various steps of the installation methodology used to install the valve assemblies.
Figure 24:
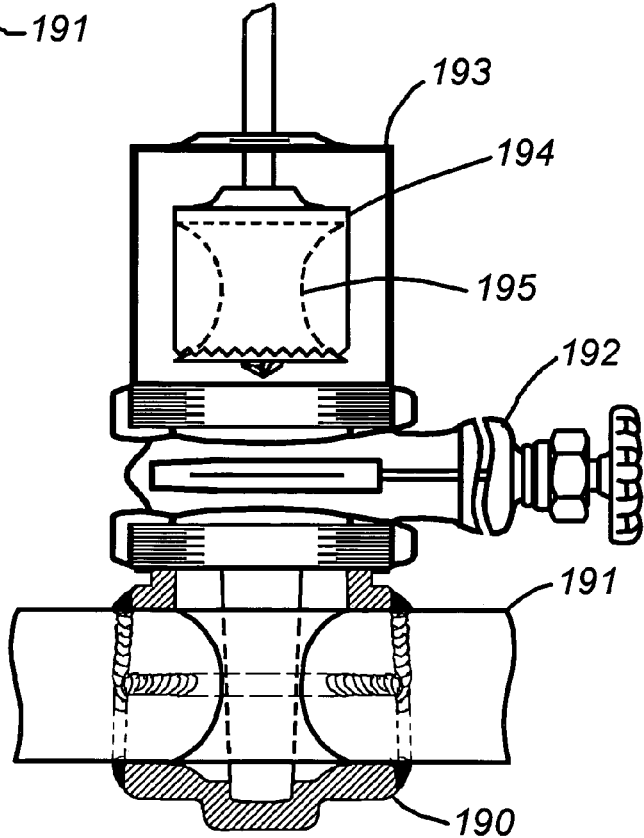

FIGS. 23 through 28 further illustrate installation methodology. A valve body 190 is installed on a pipe 191 prior to cutting a gap in the pipe 191 (FIG. 23). A temporary isolation valve 192 is attached by threaded engagement onto the outside of the valve body 190 over the access opening. A hole saw apparatus 193 (sometimes called a tapping machine) is attached to the isolation valve 192, and the valve 192 is opened.

Next, a cutting element component 194 of the hole saw apparatus 193 is advanced radially through the isolation valve 192 and through the pipe 191 to cut a gap in the pipe 191 without shutting down the line. The cutter can utilize holes in its structure to allow fluid to pass during cutting. The cut section of pipe 195 (FIG. 24) is retracted through the isolation valve 192, and the isolation valve is then closed. A pilot drill portion of the hole saw apparatus 193, located slightly ahead of the cutting element 194, has a retaining mechanism that retains the cut section of pipe 195 when retracted.

Figure 25:
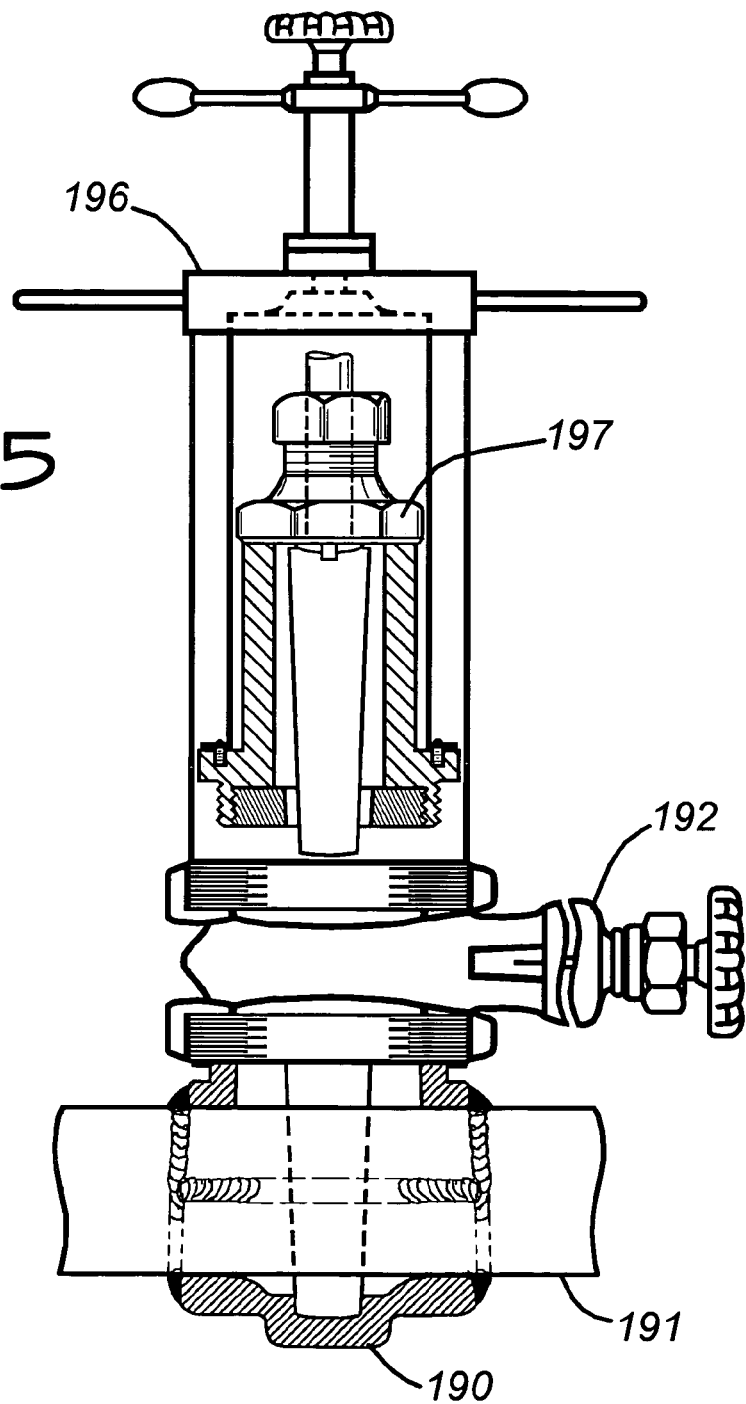

With the valve 192 closed, the hole saw apparatus 193 is removed and a bonnet/gate installation machine 196 (FIG. 25), with a bonnet/gate assembly 197 inside. The bonnet/gate installation machine 196 is sometimes referred to as a completion machine. The hole saw apparatus 193 can be modified to function for this purpose. With the machine 196 in place, the valve 192 is then opened, as illustrated in FIG. 25.

Figure 26:
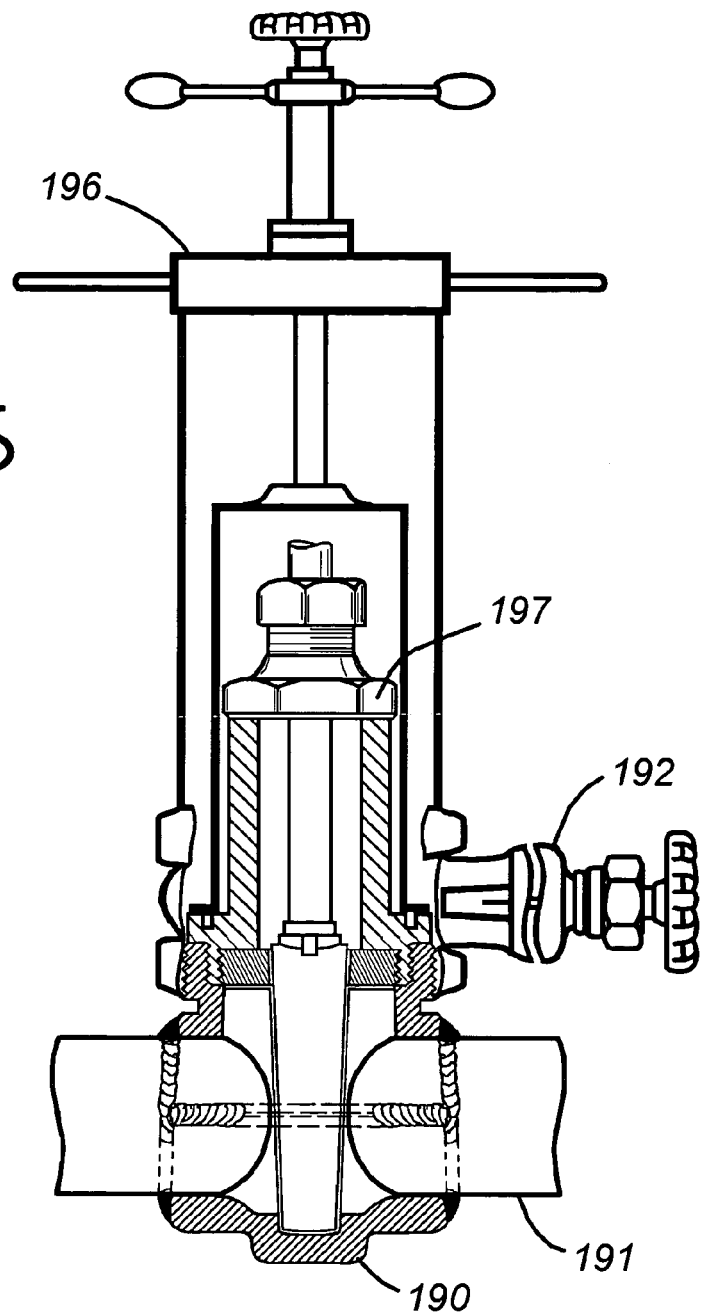

Next, the machine 196 is operated to advance the bonnet/gate assembly 197 through the isolation valve 192 into the access opening of the valve body 190 (FIG. 26). The illustrated bonnet/gate assembly 197 is screwed into fluid-tight threaded engagement of the valve body 190.

Figure 27:
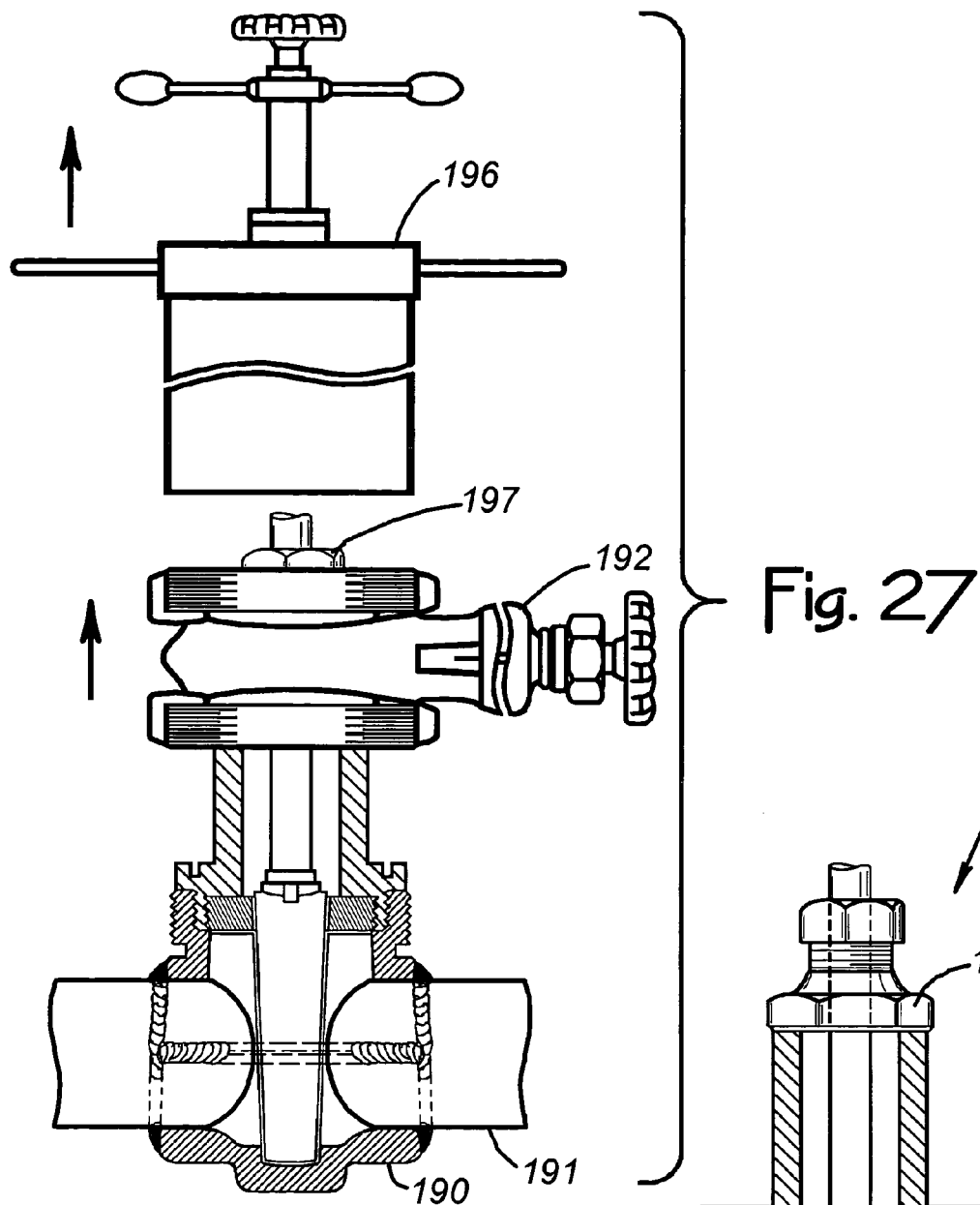
Figure 28:
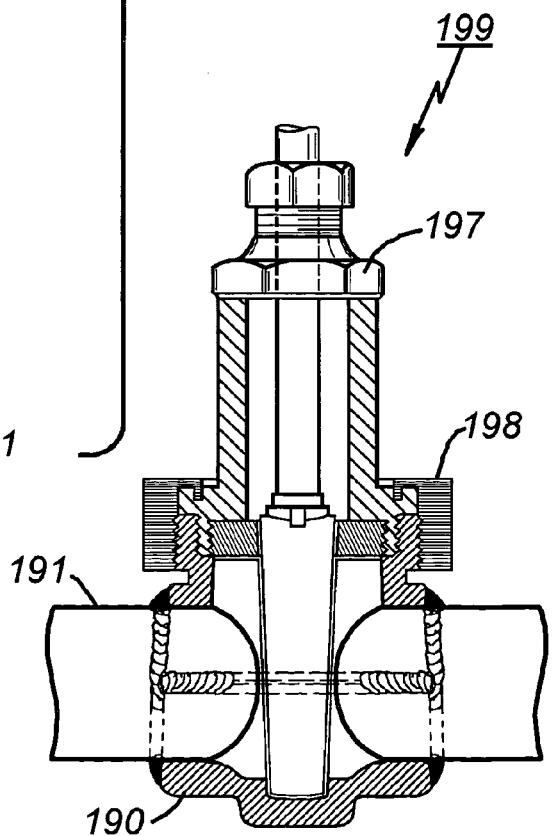

With the bonnet/gate assembly 197 in place, the bonnet/gate installation machine 196 is removed, along with the isolation valve 192 (FIG. 27). A threaded retainer/protector member 198 is then installed on the valve body, in the position shown in FIG. 28, to protect the threads on the valve body 190. The member 198 also can be used to lock-nut the bonnet/gate assembly 197 from unscrewing unintentionally. The foregoing results in the installed valve assembly 199 shown in FIG. 28 without shutting down the line.

Figure 30:
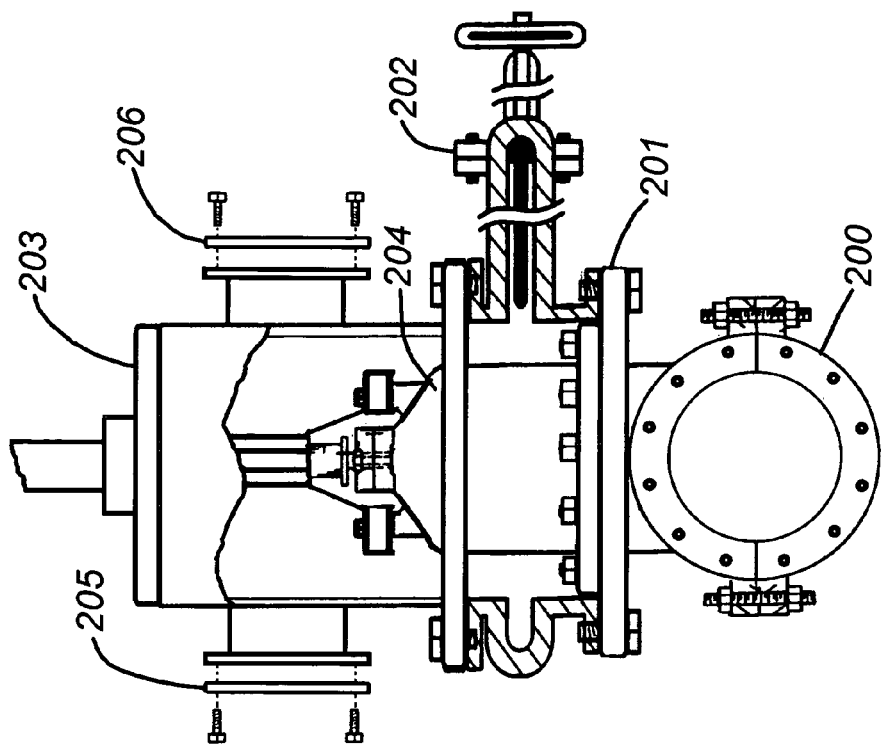
FIGS. 29 and 30 are diagrammatic representations that illustrate installation using a flange on the valve body.
Figure 29:
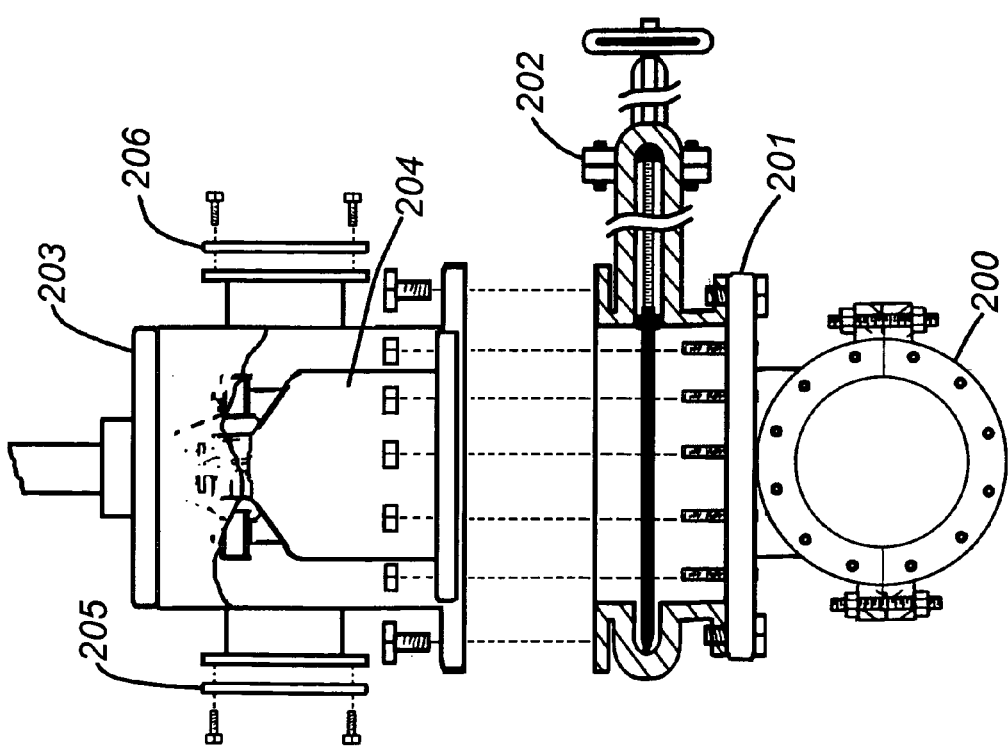

FIGS. 29 through 34 shown additional details about mounting a temporary isolation valve on the valve body in a position over the access opening instead of in the access opening. In FIGS. 29 and 30, a valve body 200 is shown that includes a bonnet-supporting flange portion 201 that incorporate two bolt-hole patterns. The isolation valve 202 is bolted to the flange portion 201 using an outside bolt-hole pattern. A bonnet/gate installation machine 203 is bolted to the isolation valve 202 and used to advance a bonnet/gate assembly 204 through the isolation valve 202 to the flange portion 201. The bonnet/gate assembly 204 is mechanically pressed against the bonnet-supporting flange portion 201, by jacking means or hydraulic means, to compress an elastomer compound or at least one O-ring located between the bonnet/gate assembly 204 and the flange 201. Then, side access port covers 205 and 206 are opened to provide access for the installation of restraining nuts that secure the bonnet/gate assembly 204 to the flange portion 201 using an internal bolt-hole pattern. An internal bolt-hole pattern with studs facilitates centering of the bonnet/gate assembly 204.

Figure 31:
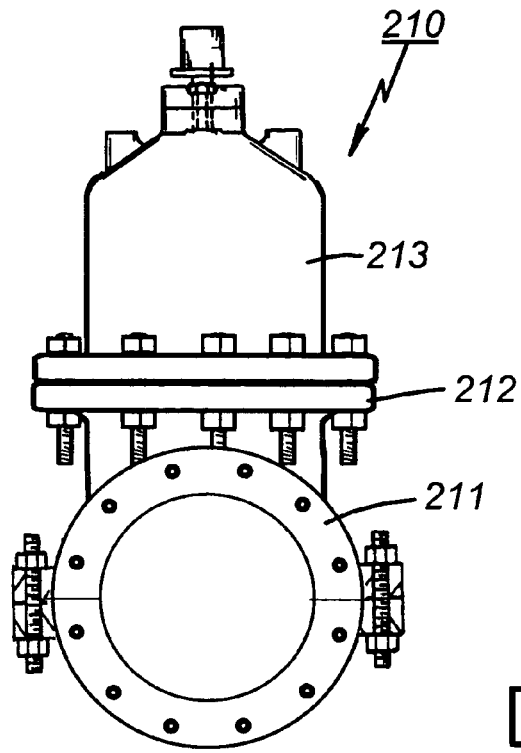
FIG. 31 is an elevation view of a valve body that uses a split flange for installation purposes.
Figure 33:
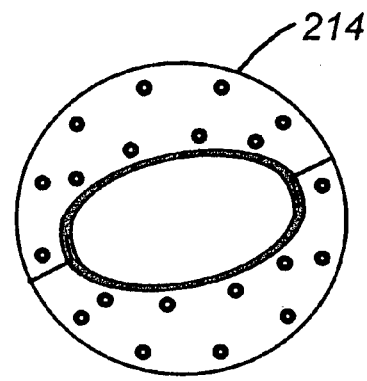
FIG. 33 is a plan view of the split flange.
Figure 34:
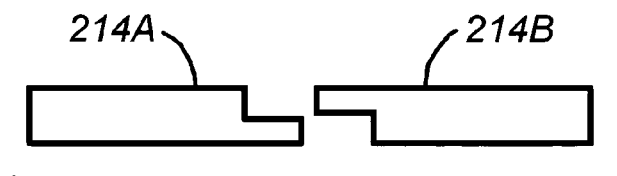
FIG. 34 is an diagrammatic representation of the split flange components.
Figure 32:
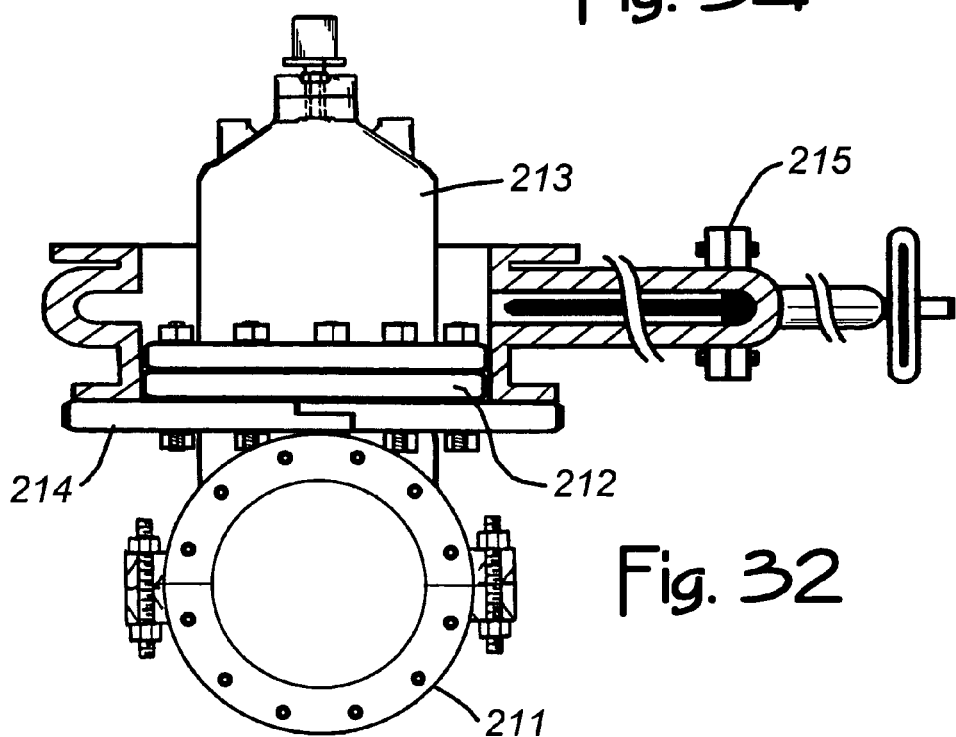
FIG. 32 is an elevation view showing the split flange and an isolation gate valve assembled on the valve body shown in FIG. 31.

A valve assembly 210 in FIGS. 31 and 32 includes a valve body 211 with a bonnet-supporting flange 212 that does not require two bolt-hole patterns. The holes in the bonnet-supporting flange 212 are threaded to receive studs that secure the bonnet/gate assembly 213 in place. A temporary flange 214 installs in a fluid-tight fit under the permanent bonnet-supporting flange 212 for installation purposes. An isolation valve is mounted on the temporary flange 214 by bolts or other suitable means (not shown). After installation, the temporary flange 214 can be removed and used elsewhere. FIG. 33 shows the temporary flange 214 as being a split flange. First and second flange sections 214A and 214B (illustrated diagrammatically in FIG. 34) assemble together to form the flange 214.

Figure 35A:
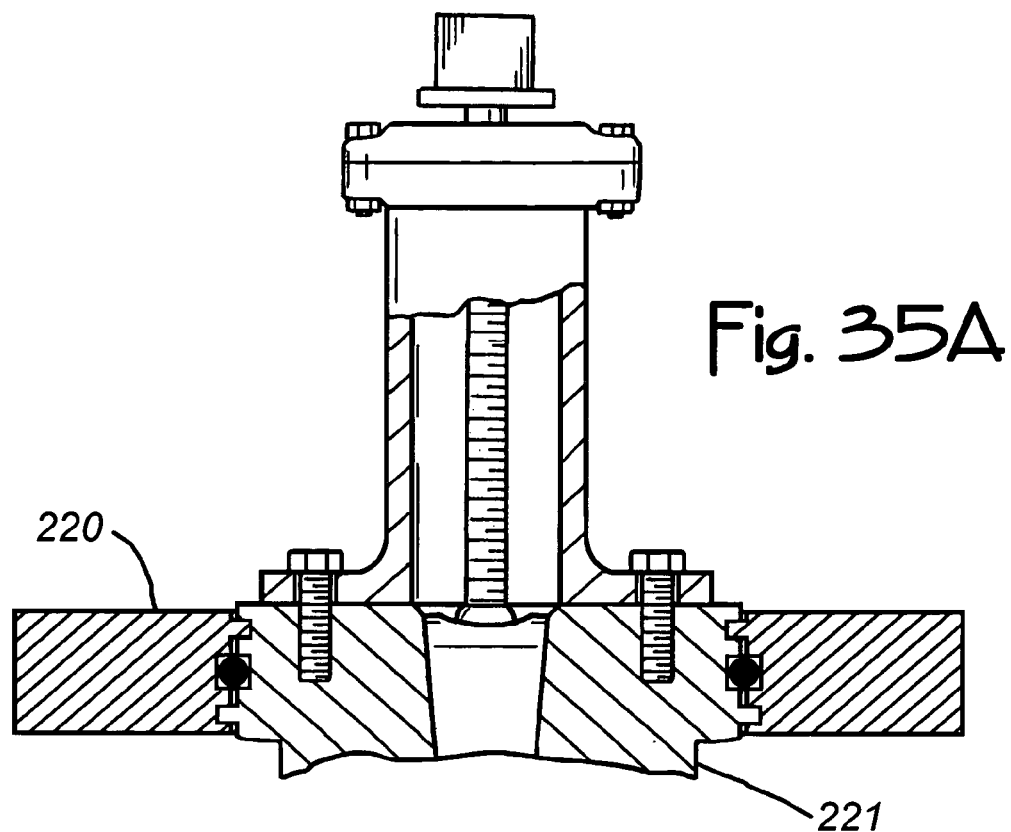
FIGS. 35A and 35B show details of another temporary installation flange arrangement.
Figure 35B:
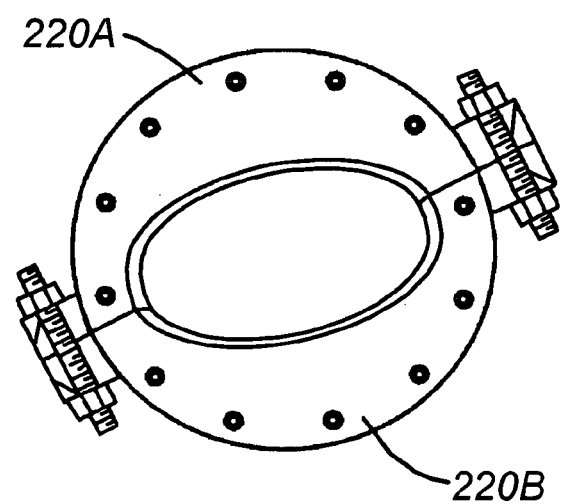

FIGS. 35A and 35B illustrate another temporary flange 220. The flange 220 includes first and second sections 220A and 220B that bolt together around the bonnet-supporting flange 221 in a fluid-tight fit. O-rings and interlocking annular protrusions and grooves are included on the temporary flange 220 that mate with annular protrusions and grooves on the bonnet-supporting flange 221.

Thus, the invention, in all its various forms, provides a valve assembly that installs conveniently using a rectilinearly advancing hole saw apparatus. It includes a gate that extends through the gap in the pipe to seat directly against the valve body in fluid-tight engagement without needing to contact the pipe to effect a seal. Although exemplary embodiments have been shown and described, one of ordinary skill in the art may make many changes, modifications, and substitutions without necessarily departing from the spirit and scope of the invention.

What is claimed is:

1. A valve assembly for insertion in a line formed by an existing pipe of predetermined outside diameter containing fluid under pressure, the valve assembly comprising:

a first subassembly that includes a valve body having opposite first and second ends, a valve body axis extending between the first and second ends, and a bonnet-supporting flange intermediate the first and second ends that defines an access opening facing radially away from the valve body axis, the valve body being adapted to be assembled over the existing pipe so that the pipe extends along the valve body axis between the first and second ends of the valve body and so that a user can access the pipe within the valve body through the access opening for purposes of cutting and removing a section of the existing pipe with a hole saw in order to form a gate-receiving gap in the pipe; and a second subassembly that includes a bonnet having a gate and a flange-mating portion, the bonnet being adapted to function as means for moving the gate through the access opening into the valve body, between an open position of the gate in which the first and second ends of the valve body are in fluid communication and a closed position of the gate in which the gate extends through the gate-receiving gap in the pipe and into fluid-tight engagement of the valve body such that the first and second ends of the valve body are not in fluid communication;

wherein the flange-mating portion of the bonnet defines a gate opening through which the gate extends from the bonnet in a fluid-tight fit; and wherein the flange-mating portion of the bonnet fits into the access opening in a fluid-tight fit;

thereby enabling a user to mount the bonnet on the valve body through a temporary isolation valve mounted on the bonnet-supporting flange in order to facilitate insertion of the valve assembly when the existing pipe contains fluid under pressure;

wherein said first and second ends of the valve body are not connected to each other solely by valve body structure that is rotatable about the valve body axis independent of the first and second ends;

wherein said first and second ends of the valve body are not rotatable about the valve body axis relative to each other;

wherein said bonnet-supporting flange is not rotatable about the valve body axis relative to the first and second ends;

wherein the access opening is sufficiently large to receive a cylindrically shaped hole-cutting element of the hole saw having an outside diameter no smaller than the predetermined outside diameter of the pipe as the hole-cutting element advances radially relative to the valve body axis through the access opening toward the pipe;

wherein the valve body defines a hollow interior that is sufficiently large to receive the cylindrically shaped hole-cutting element as the cylindrically shaped hole-cutting element rotates and advances radially entirely through the pipe to form the gate-receiving gap in the pipe;

wherein the gate is adapted to extend, in the closed position of the gate, through the gate-receiving gap in the pipe and into direct fluid-tight engagement of the valve body without needing to rely on contact with the pipe to effect a seal; and wherein the second subassembly includes a sealing member mounted on the flange-mating portion of the bonnet and the valve body for contacting the gate in fluid-tight sealing engagement of the gate.

* * * * *